United States Patent [19]

Thirion et al.

[11] Patent Number: 5,499,322
[45] Date of Patent: Mar. 12, 1996

[54] DEVICE FOR PROCESSING THREE-DIMENSIONAL IMAGE INFORMATION, WITH EXTRACTION OF SIGNIFICANT LINES

[75] Inventors: Jean-Philippe Thirion; Nicholas Ayache; Olivier Monga; Alexis Gourdon, all of Paris, France

[73] Assignee: Inria Institut National de Recherche en Informatique et en Automatique, Le Chesnay Cedex, France

[21] Appl. No.: 40,292

[22] Filed: Mar. 30, 1993

[30] Foreign Application Priority Data

Mar. 31, 1992 [FR] France .................................. 92 03900

[51] Int. Cl.$^6$ .................................................. G06T 17/40
[52] U.S. Cl. .......................................... 395/118; 395/124
[58] Field of Search .................................. 395/118, 119, 395/124, 132, 129; 382/25, 26

[56] References Cited

U.S. PATENT DOCUMENTS

| | | | |
|---|---|---|---|
| 4,879,668 | 11/1989 | Cline et al. ............................. | 364/522 |
| 5,027,422 | 6/1991 | Peregrim et al. ........................ | 382/48 |
| 5,048,103 | 9/1991 | Leclerc et al. .......................... | 382/44 |
| 5,191,642 | 3/1993 | Quick et al. ........................ | 395/118 X |
| 5,263,130 | 11/1993 | Pomerantz et al. ...................... | 395/118 |

FOREIGN PATENT DOCUMENTS 0204225  12/1986  European Pat. Off. .

OTHER PUBLICATIONS

Lorensen et al., "Marching Cubes: A High Resolution 3D Surface Construction Algorithm," *Computer Graphics*, vol. 22, No. 4, Jul. 1987, pp. 163–169.
Gueziec et al., "Smoothing and Matching of 3–D Space Curves," INRIA Research Report No. 1544, Oct. 1991, pp. 1–29.
Gallagher et al., "An Efficient 3–D Visualization Technique for Finite Element Models and Other Coarse Volumes," *Computer Graphics*, vol. 23, No. 3, Jul. 1989, pp. 186–194.
Wyvill et al., "Date Structure for Soft Objects," *The Visual Computer*, vol. 2, 1986, pp. 227–234.
Wallin et al., "Constructing Isosurfaces from CT Data," *IEEE Computer Graphics & Applications*, 1991, pp. 28–33.
Wilhelms et al., "Topological Considerations in Isosurface Generation," Apr. 19, 1990, pp. 1–26.

*Primary Examiner*—Heather R. Herndon
*Assistant Examiner*—Cliff N. Vo
*Attorney, Agent, or Firm*—Foley & Lardner

[57] ABSTRACT

An image is defined, in correspondence with a predetermined polyhedral meshing of a portion of the space, by a numerical value for each vertex of the meshing. Polygon processing includes receiving a representation of a plane polygon with p vertices, p respective values for these p vertices, and a threshold. In correspondence with the polygon, polygon processing supplies a list of oriented segments linking points of the edges of the polygon which are interpolated as being equal to the threshold, with a predetermined direction convention. Polyhedron processing includes receiving a representation of a polyhedron with the values at its vertices and a threshold. Polyhedron processing then invokes polygon processing for all the faces of the polyhedron, which supplies a list of oriented segments. Polyhedron processing then associates with the polyhedron a list of closed and oriented cycles, constituted by segments from the said list of segments. Main processing includes sequentially presenting a plurality of polyhedrons of the polyhedrons meshing for the polyhedron processing, with the values associated with their vertices and a threshold. The cycles thus obtained belong to an iso-surface of the image for the threshold value.

24 Claims, 25 Drawing Sheets

○ represents +, or also 1

● represents −, or also 0

- direction of travel
- orientation of the normal
- numbering of the bits

DEVICE FOR PROCESSING THREE-DIMENSIONAL IMAGE INFORMATION, WITH EXTRACTION OF SIGNIFICANT LINES

FIELD OF THE INVENTION

The invention relates to the processing of three-dimensional numerical images. It applies in particular, but not exclusively, to images known as medical images.

In the medical field, modern apparatus such as X-ray scanners or nuclear magnetic resonance apparatus supply numerical measurement information related to points in three-dimensional space. There are thus three coordinates to define the point in space, plus the measured quantity attached to this point. Any numerical representation of a set of measured or calculated quantities ("value") related respectively to a set of points in space is here referred to as "three-dimensional image".

The processing of three-dimensional images is particularly problematic, in particular as soon as human intervention is required. For example, the visual display of a three-dimensional image on a (two-dimensional) screen cannot be done directly: if all the points of the image are displayed on this screen in perspective with a representation of their "value", the result on the screen will be completely indecipherable.

PRIOR ART

The simplest thing then is to consider only a section of the image, that is to say a two-dimensional sub-set of the latter. But it is clear that a section includes much less useful information than the whole of the three-dimensional image. Even by using numerous sections, not all this useful information is recovered, and its relationships even less so.

A known means consists in searching in the three-dimensional image for surfaces known as "iso-intensity" surfaces ("iso-surfaces" for short). These iso-surfaces are the counterpart, in the case of three-dimensional images, of the level lines for the case of two-dimensional images (where the altitude is considered as "value" at each point).

An iso-surface is defined with respect to a chosen threshold, applied to the said measured "value". The threshold is called "iso-value". The iso-surface is the surface which separates:

the regions of the space for which the measured value is less than or equal to the threshold, and the regions for which the measured value is strictly greater than the threshold.

In theory, the determination of an iso-surface would assume that a continuous function were known, capable of associating the measured value with every point in space.

In practice, all that is available is a numerical image defined by sampling for a limited number of points in space. An interpolation function makes it possible to calculate the "value" for points lying between two sampled points.

The person skilled in the art knows that iso-surfaces possess specific topological properties: they are continuous, without a hole, and do not intersect each other.

In concrete terms, the article "Marching Cubes: A high resolution 3D surface reconstruction algorithm", William E. LORENSEN and Harvey E. CLINE, Computer Graphics, volume 31, No.4, July 1987, describes a technique for extracting iso-surfaces from a three-dimensional image.

The use of this technique has allowed significant progress, in particular in the processing of medical images. However, this technique suffers from various drawbacks. One of them is the fact that the surfaces obtained most often exhibit holes; this will be discussed again later; another drawback is precisely the fact that this technique allows only surfaces ("iso-surfaces") to be extracted.

OBJECTS OF THE INVENTION

It is a first object of the present invention to improve the situation in this field of image processing, in particular of medical image processing.

It is a second object of the invention is firstly to allow extraction not only of surfaces (without holes) but also of significant lines, such as "bi-iso-lines". A bi-iso-line is the intersection line of two iso-surfaces, defined on the basis of two different images, or more generally by two different continuous functions F1 and F2 of the three-dimensional space, related to one or more images.

It is another object of the invention to obtain a representation of the bi-iso-lines, on the basis of a polyhedral meshing of the three-dimensional space which is not necessarily parallelepipedal, but may be any shape (meshing of the "finite elements" type).

It is yet another object of the invention to make it possible to determine differential characteristics of the iso-surfaces of a three-dimensional image.

The invention also has the object of allowing determination of significant lines such as the bi-iso-lines with a particular polyhedral meshing, especially the meshing constituted by a regular grid of identical elementary cubes, or that constituted by complementary tetrahedrons.

The invention also has the object of calculating from a given three-dimensional numerical image, significant lines of the latter which depend on the differential characteristics of the iso-surfaces which it contains.

The invention also has the significant object of allowing measurement in a three-dimensional image of an extreme coefficient, which characterizes the crest lines of the iso-surfaces, and will be defined in detail later.

SUMMARY OF THE INVENTION

The invention makes it possible to extract iso-surfaces from a three-dimensional numerical image. It exhibits two advantages in this respect. On the one hand, it makes it possible to work from any polyhedral meshing of the space (and not necessarily from a grid of identical cubes, as in the state of the art). On the other hand, the known means exhibit the drawback of supplying iso-surfaces in which holes exist, a drawback which is overcome by the technique of the present invention, (except, naturally, the edges of the image).

In a general definition of the invention, an electronic device is provided for processing image information, which comprises:

image definition means able to supply, in correspondence with a predetermined polyhedral meshing of a portion of the space, a numerical value for each vertex of the meshing, polygon processing means, able to receive a representation of a plane polygon (F) with p vertices, p respective values for these p vertices, and a threshold (S), and to supply, in correspondence with the polygon F, a list of oriented segments linking points of the edges of the polygon which are interpolated as equal to the threshold, with a predetermined direction convention, polyhedron processing means able to receive a representation of a polyhedron with the values at its vertices and a threshold, then to invoke the polygon processing means for all the faces of the polyhedron, which supplies a list of oriented segments, then to associate with the polyhedron a list of closed and oriented cycles constituted by segments from the said list of segments, and main processing means able to present sequentially a plurality of polyhedrons of the said meshing to the polyhedron processing means, with the values associated with their vertices and a threshold.

The cycles thus obtained belong to an iso-surface of the image for the said threshold value.

Expedient variants are provided in the case of meshes said to be cubic or tetrahedral.

Advantageously, means are added thereto for controlling the mesh-by-mesh exploration of the polyhedrons of the said portion of space by the main processing means, either at will, or by following an intersection line of two iso-surfaces.

Preferably, the main processing means are able to receive two sets of values for the points of the said portion of space, as well as two thresholds or iso-values, and to determine characteristic lines by intersection of the two corresponding iso-surfaces. It is particularly beneficial that the second set of values be constituted by differential quantities relating to the first set of values.

A beneficial application is then the realignment of one image with respect to another, with a view to their comparison.

BRIEF DESCRIPTION OF THE DRAWINGS

Other characteristics and advantages of the invention will appear on examining the detailed description which will follow, as well as the attached drawings, in which:

FIG. 12B is a drawing comparable to FIG. 7A, but obtained with the routine of FIG. 12A;

FIG. 19 is a theoretical diagram of a third embodiment of the invention, while

DESCRIPTION OF THE PREFERRED EMBODIMENTS

The drawings are, in essence, specific in nature. Consequently, they form an integral part of the present description. They may therefore serve not only to make the invention better understood, but also to contribute to the definition of the latter.

Moreover, all the complex formulae are listed as an appendix, at the end of the description. Appendix 1 (several pages) gives the formulae of general interest. Appendix 2 defines the formulae and the notation convention for the differentials of a function F defined in three-dimensional space. Appendix 3 defines a CURVES structure which is useful for implementing the invention.

Figure 1:
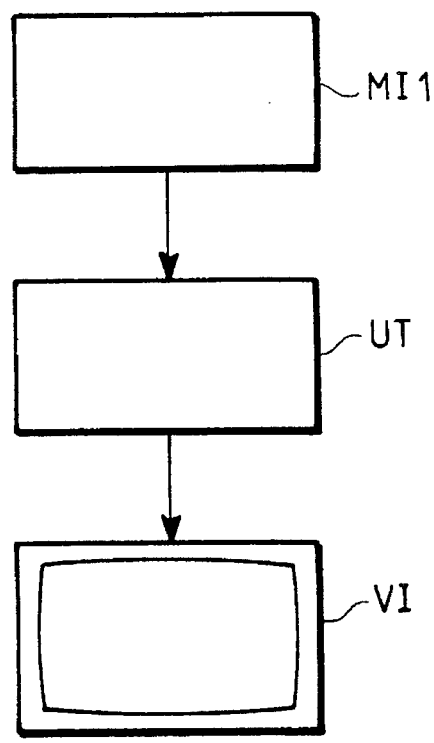
FIG. 1 illustrates the theoretical diagram of a visual display device for a three-dimensional image.

In FIG. 1, an image memory MI1 is linked to a processing unit UT, for example of the "workstation" type, capable of driving a visual display device VI, such as a high-definition monitor.

Figure 2:
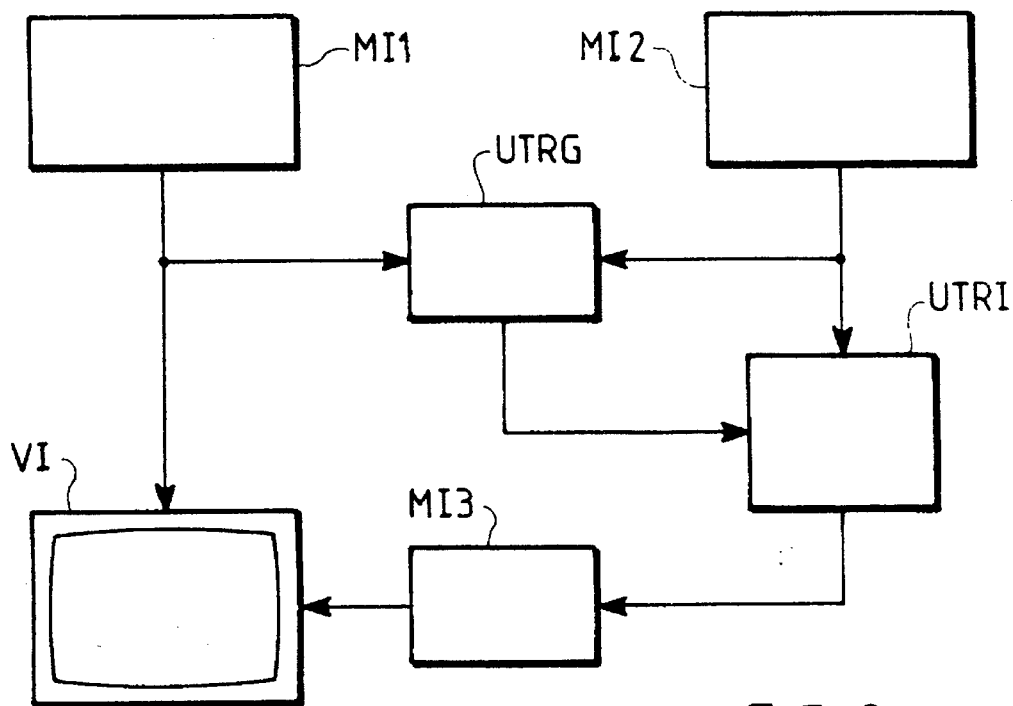
FIG. 2 illustrates the theoretical diagram of a device allowing the bringing together of two three-dimensional images relating to the same object but taken differently.

In FIG. 2, two image memories MI1 and MI2 have received image information, sampled according to the same meshing of the space, but relating to different recorded views of the same object. A first processing unit UTRG will carry out a geometric realignment of the two images with respect to one another by using their significant lines: this results in a geometric transformation which makes it possible to pass from one image to the other. A second processing unit UTRI takes up the second image MI2, in order to resample it in the same meshing of the space as the image MI1, taking account of the geometric transformation given by the unit UTRG. The image obtained after resampling, directly comparable with the image MI1, is stored in a memory MI3. The visual display unit VI may then produce any desired combined display of the two images MI1 and MI3, for a doctor for example.

The invention will first of all be described in its most general application, by reference to any polyhedral meshing M of a portion of the three-dimensional space. Each of the polyhedrons is called "mesh". It is not necessary for there to be a repetitive pattern, that is to say that the meshing be regular. The polyhedrons are assumed to be convex, although concave polyhedrons may arise, at least in certain cases.

In this general case, it is necessary to have available a means, for example a list in memory, defining each of the convex polyhedrons constituting the polyhedral meshing of the space; it is necessary to add thereto, for each polyhedron, a definition of each of the face of the polyhedron.

For example, the polyhedral meshing may be supplied in the shape of a file containing the list of the polyhedrons composing the meshing; each polyhedron is defined in its turn by a list of plane polygons which define each of its faces; finally each plane polygon is defined by the ordered list of its vertices, which are points with real coordinates in the three-dimensional space. Needless to say, this means of defining the meshing is given only by way of example, other formats being envisageable.

Figure 3A:
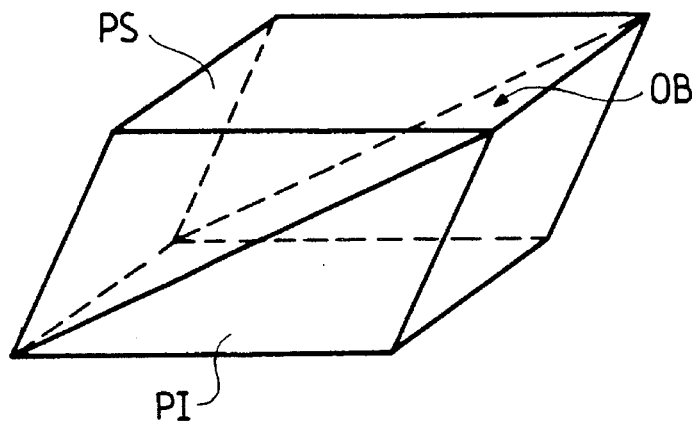
FIGS. 3A to 3C illustrate an example of polyhedral meshing of the space.

By way purely of illustration, FIG. 3A illustrates a very simple meshing, constituted by an upper prism PS and by a lower prism PI, joined together in an oblique plane OB. The list of the polyhedrons comprises two meshes—these two prisms. Each prism (the polyhedron) is defined by an ordered list of its five faces, which are triangles or parallelograms. Each face is defined by the series of its points, run through for example in the direction given by the corkscrew rule (well known in electromagnetism, also called right-hand rule, or the bonhomme d'Ampere rule), with respect to the normal N, oriented outwards from the polyhedron.

Figure 3B:
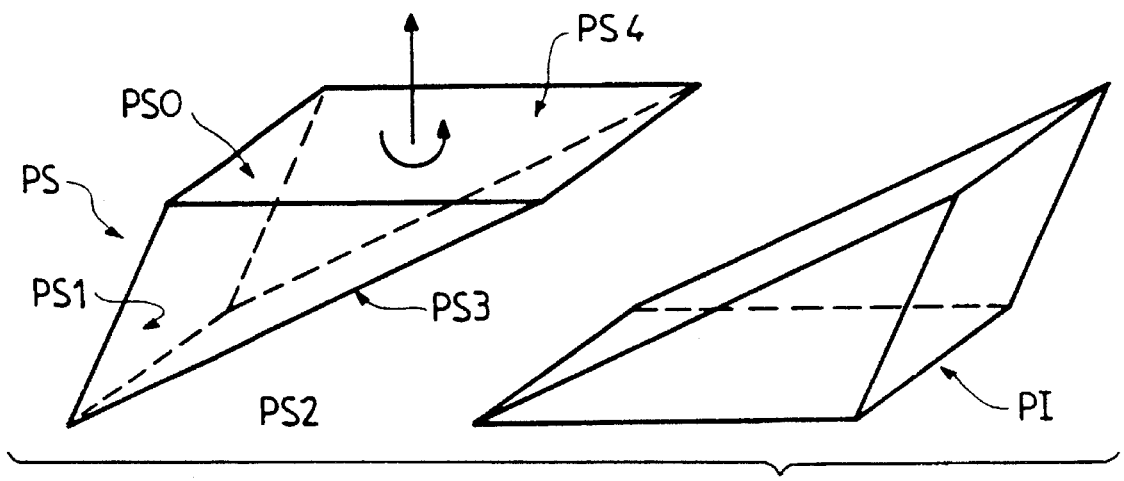
Figure 3C:
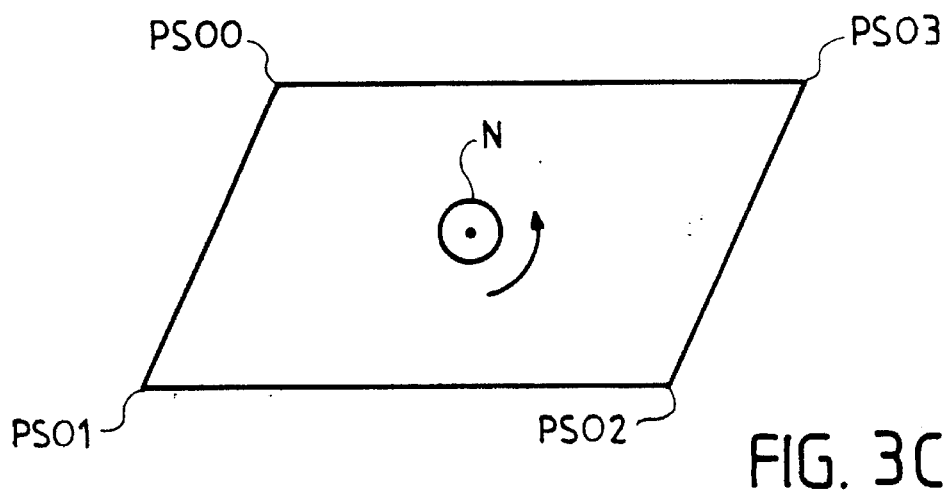

FIG. 3B illustrates the two separate polyhedrons. It also illustrates, purely by way of example, a numbering of the faces of the upper polyhedron PS. And FIG. 3C illustrates a mode of running through the vertices of the upper parallelogram PSO of the polyhedron PS.

Each node of the polyhedral meshing is definable by a numerical representation of its coordinates (X,Y,Z). At this node there is available a numerical value V, drawn from a measurement, taken, for example, with the aid of an X-ray scanner, or calculated from a measurement, or obtained in any other way in numerical form.

This information is stored in the memory MI1 of FIG. 1, with the complete definition of the polyhedral meshing.

The numerical representation of the threshold or iso-value with respect to which bi-iso-lines or iso-surfaces will be defined is generally denoted by S.

In what follows, lists or series will be defined, distinguished by different "names". This notation makes reference to a chained set of memory cells each of which contains a value and a pointer to the following cell, as is known in the programming language known as LISP (acronym for "LISt Processing"). Open lists, with a "ZERO" pointer at the end of list, and closed lists or "cycles" which loop back to their start point will be distinguished here. The cells are allocated dynamically in correspondence with the "name" of the list (for example: CYCLE). Although the image memory may be used to do that, it is preferable to use a working memory.

Figure 4:
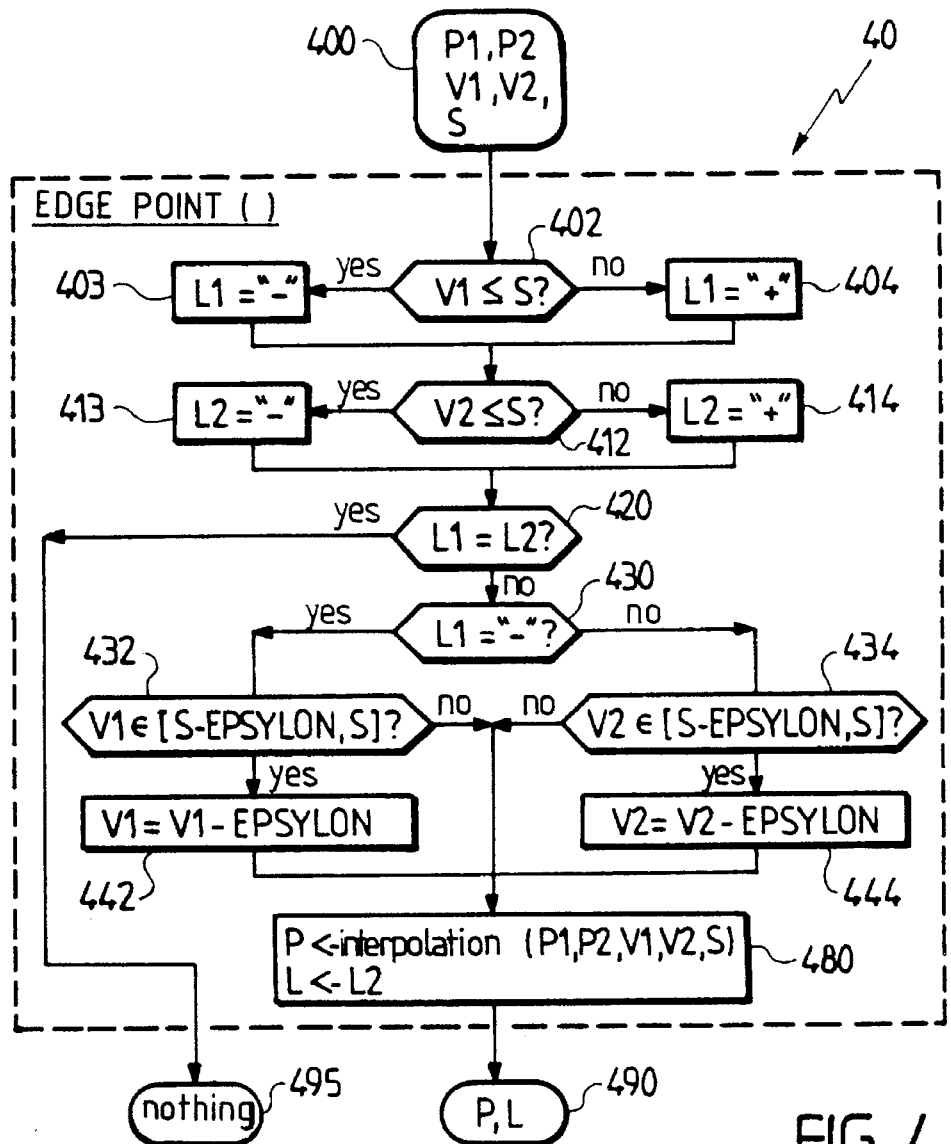
FIG. 4 illustrates a routine, called EDGE_POINT(), and FIG. A is an illustrative drawing of the latter.
Figure 4A:
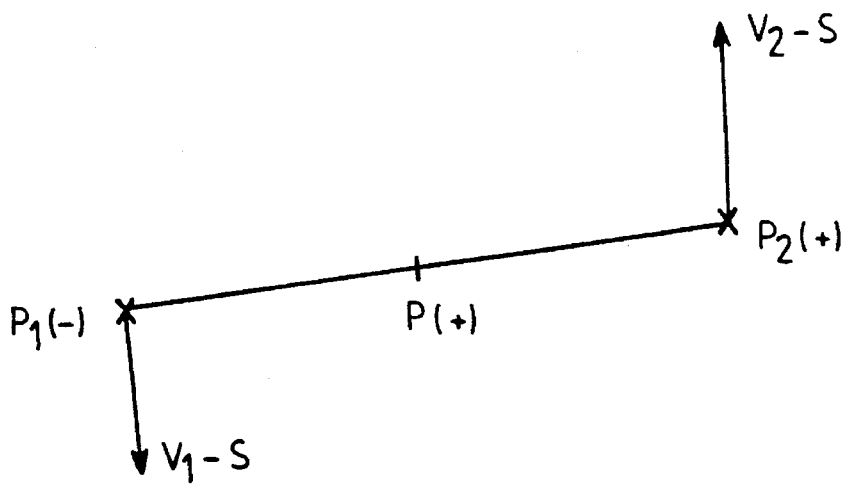

The invention first of all makes use of a first basic routine 40, named EDGE_POINT(), described with reference to FIGS. 4 and 4A.

The input block 400 of this routine receives the coordinates (X,Y,Z) of two points P1 and P2 of the three-dimensional space, the values V1, V2 associated with these two points, as well as the threshold value S.

The test 402 determines whether the value V1 is less than or equal to the threshold S. If yes, a signal L1 is created (403) associated with the point P1 and possessing the sign "−". If not, it is given (404) the sign "+". Next, from a step 412, the same is done with V2 and the signal L2 at steps 413 and 414.

At step 420, if the signals L1 and L2 are of the same sign, the direct output 495 gives nothing (no intermediate point of the segment P1, P2 which possesses the value S). If they are of different signs, step 430 searches whether L1 possesses the sign "−". If yes, a search is done (432) to see whether V1 is close to S by lower values, within the limit of a small epsilon quantity If L1 has the sign "+", the same is done at step 434, but with the quantity V2.

If one or the other of these two quantities is close to the threshold to within epsilon, it is reduced by epsilon, respectively at steps 442 and 444.

After that, step 480 carries out an interpolation, on the basis of the values V1 and V2, between the points P1 and P2, for example by the formula (XV), Appendix 1. Thus the intermediate point P of the segment P1, P2 is determined where the interpolated value is equal to the threshold S (FIG. 4A). At the output 490, a signal L having the sign of L2 is associated with this point P.

The person skilled in the art will understand that the notation of the signs by "+" and "−" is illustrative. It may be replaced by any other two-state notation, such as "0" and "1", for example. In what follows, a sign or "label" will be spoken of.

Figure 5:
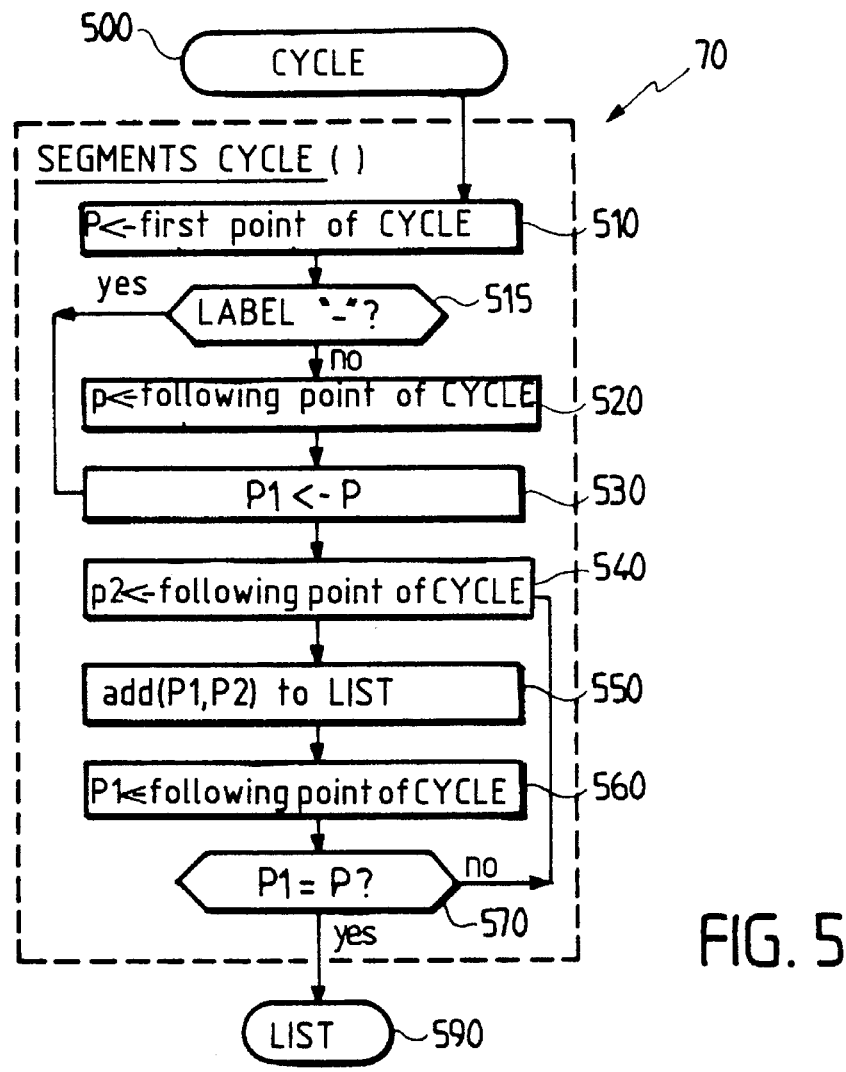
FIG. 5 illustrates a routine, called SEGMENTS_CYCLE()
Figure 5A:
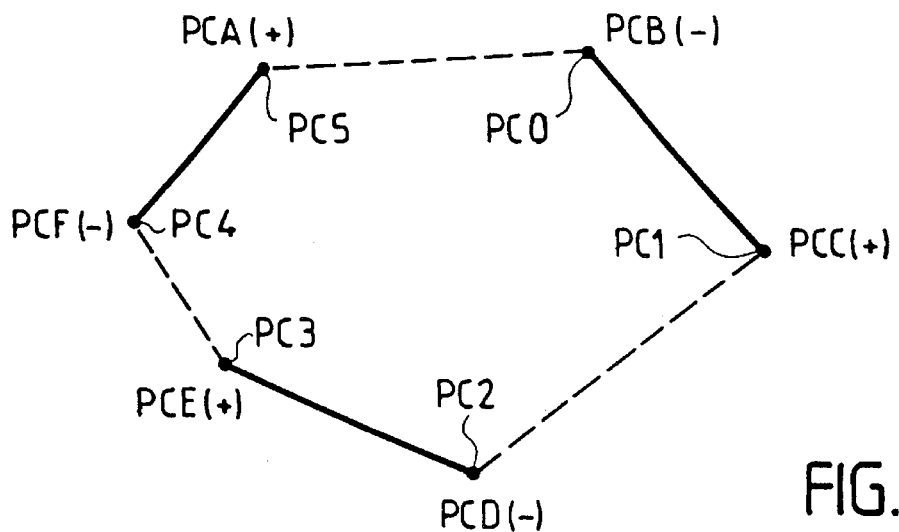
FIG. 5A is an illustrative drawing of the latter.

Reference is now made to FIGS. 5 and 5A, which illustrate a routine 70, called "SEGMENTS_CYCLE()".

The input 500 of the routine 70 is a CYCLE, defined in the manner illustrated in FIG. 5A by an ordered series of points (not necessarily coplanar), looped back on itself. The person skilled in the art will understand that the number of points of this series is even, but unknown in the general case of any polyhedral meshing. These points are denoted PCA to PCF on the drawing (for illustration, the routine not having to know this identification of the points). Each point is provided with a sign, which can be that previously described in connection with FIG. 4.

Step 510 of FIG. 5 consists in examining the first point of the cycle (PCA) in order to test, at 515, if its sign has the predetermined one of its two possible states ("−" is chosen by way of example). If the sign of this first point is "−", it will remain the first point PC0 examined by this routine. If not, step 520 takes the following point (PCB), as first current point P.

At step 530, a first current point P (PC0) is therefore the start point. Step 540 examines the following point (PC1). The routine notes these two points P1 and P2. Step 550 consists in adding the segment (P1, P2) to a list of segments denoted by LIST. Step 560 considers the following point of the cycle as new point P1. If the start point P (PC0) is returned to, the complete LIST is passed to the output step 580. If not, test 570 returns to step 540, in order to complete the LIST.

The effect of this mechanism, illustrated in FIG. 5A, is to convert a closed cycle of points into a list of segments each having as its origin a point whose sign is "−" (for example) and, as its extremity, a point possessing the other sign "+".

Figure 6:
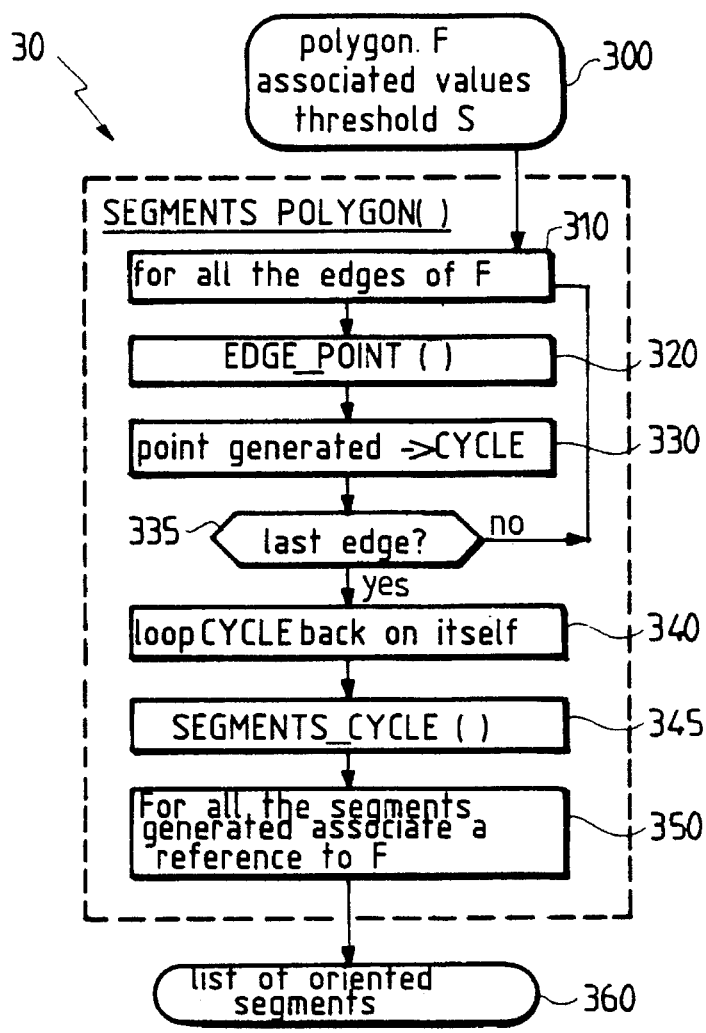
FIG. 6 illustrates a routine, called SEGMENTS_POLYGON()
Figure 6A:
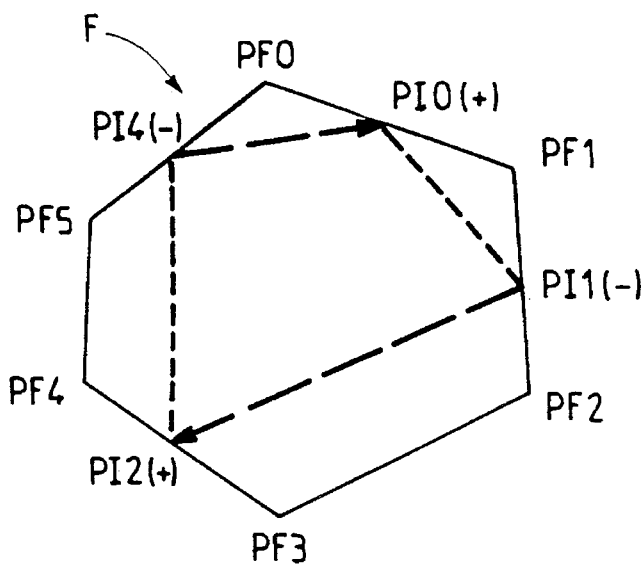
FIG. 6A is an illustrative drawing of the latter.

Reference is now made to FIGS. 6 and 6A, for the description of a routine 30, called "SEGMENTS_POLYGON()".

The input 300 of this routine is a polygon F, as illustrated in FIG. 6A. The number of vertices of F is even but unknown, at the start (here 6 points PF0 to PF5). With these points are associated "values". The input also comprises the threshold S.

For all the edges of this polygon F (310), the already described routine 40 or EDGE_POINT() is called at 320, with, as parameters, the two vertices of the edge, their "values", and the threshold S. If the values of the two vertices are placed on either side of the threshold S, the routine 40 will supply an intermediate point, generated as defined in connection with FIG. 4. This point is stored in a list denoted CYCLE (closed later).

This is repeated up to the last edge (335). In this way, for example, the four points PI0 to PI4 illustrated in FIG. 6A will be obtained, with, necessarily, alternate signs.

Step 340 consists in looping back the CYCLE on itself in order to close it. A link is therefore added between PI4 and PI0. The CYCLE is illustrated in dotted lines in FIG. 6A.

After that, step 345 consists in calling the routine 70 or SEGMENT_CYCLE() described in connection with FIG. 5. This supplies two segments, from PI1 to PI2, and from PI4 to PI0, respectively, differentiated by a long dotted line in FIG. 6A.

At step 350, the list of (here two) segments thus generated is supplemented by the fact that it is associated with a reference to the polygonal face F processed. This results, at 360, in a LIST of oriented segments assigned to this polygonal face, stored in memory.

Figure 7:
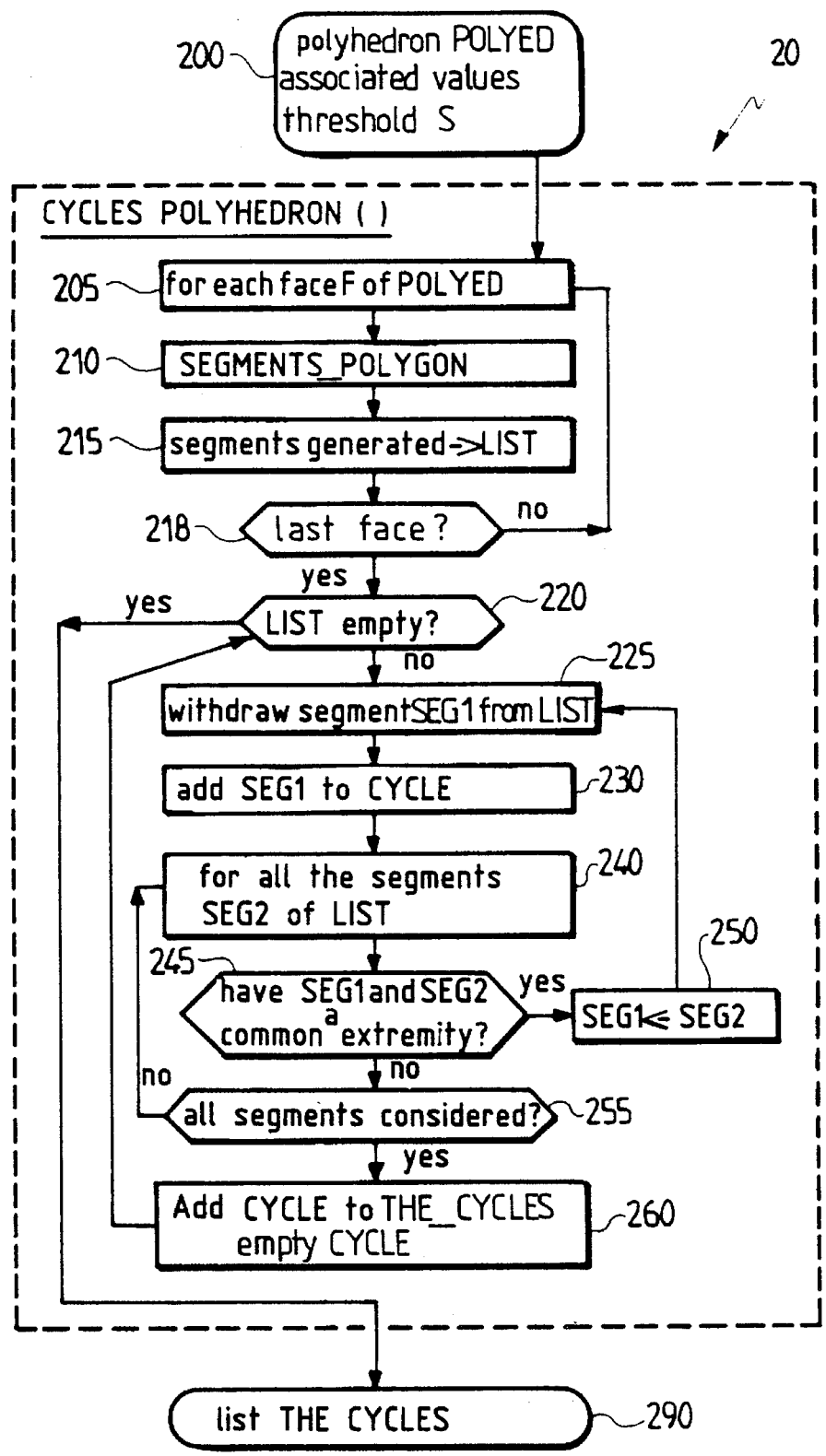
FIG. 7 illustrates a routine, called CYCLES_POLYHEDRON()
Figure 7A:
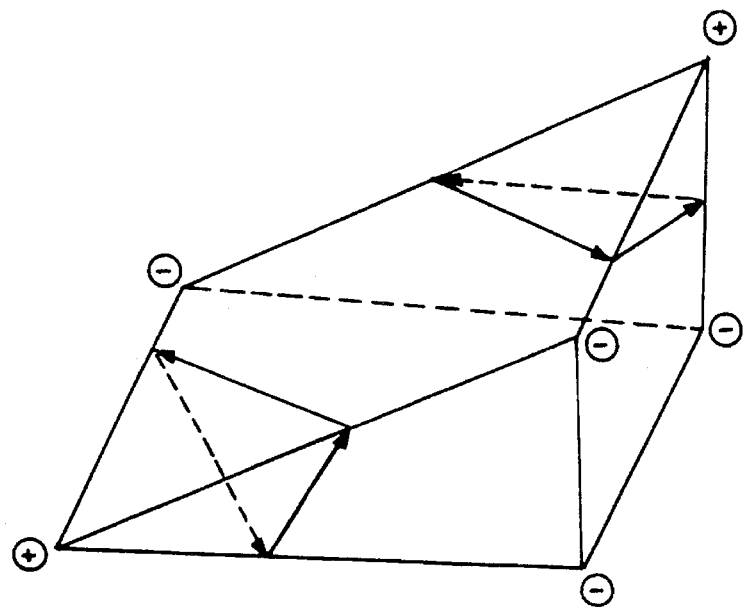
FIG. 7A is an illustrative drawing of the latter.

Reference is now made to FIGS. 7 and 7A, for the description of the routine 20, called CYCLES_POLYHEDRON().

The input of this routine at 200 is the definition of a polyhedron such as that illustrated in FIG. 7A, with the threshold S. A measured value is associated with each of the vertices.

At step 205, a loop is started which will process all the faces of the polyhedron up to step 218.

The body of the loop consists of a call 210 to the routine SEGMENTS_POLYGON(), which has just been described. This results, for the face in question, in a LIST of segments, as recalled by step 215. A very simple example is given in FIG. 7A for the upper face of the polygon.

The second part of the routine consists in analysing the links between all the segments thus obtained in LIST, for all the faces of the polyhedron in question. The aim is to define a CYCLE or a plurality thereof, two in the example of FIG. 7A (the whole will be denoted THE_CYCLES). In each CYCLE, segments are stored which join in pairs and together form a continuous loop. The person skilled in the art will understand that segments which join together always exist, since their extremities are points interpolated on edges, corresponding to the threshold value and to the values associated with the extreme points of the edge in question, this by the same routing. Whatever the face in question of the polyhedron, such a point will always be the same for the edge in question.

Step 220 determines whether the LIST of the segments is empty. As long as it is not, a first segment SEG1 is taken in this list at step 225. Step 230 consists in introducing this segment into a temporary list named CYCLE. After that, a loop going from steps 240 to 245 considers all the other segments of the list. As soon as one of them is found, SEG2, which has a common extremity with the current segment SEG1, at step 245, then step 250 takes this segment SEG2 as new current segment SEG1 and returns to step 225 in order to finally withdraw it from the list in question, then at step 230 to add it to the list CYCLE, and so on until all the segments have been processed.

Thus a CYCLE is obtained. Step 260 consists in adding this CYCLE to an overall list denoted THE_CYCLES, after which the temporary list CYCLE is deleted.

The person skilled in the art will understand in fact that:
on the one hand, if there is a segment, there always exists a series or CYCLE of segments, which will reclose on itself, to which this segment belongs;
but the set of segments which it will be possible to constitute over a given polyhedron may include several cycles of this type (FIG. 7A).

This gives rise to the definition of the overall list of the cycles generated denoted THE_CYCLES and obtained at step 290.

Figure 8:
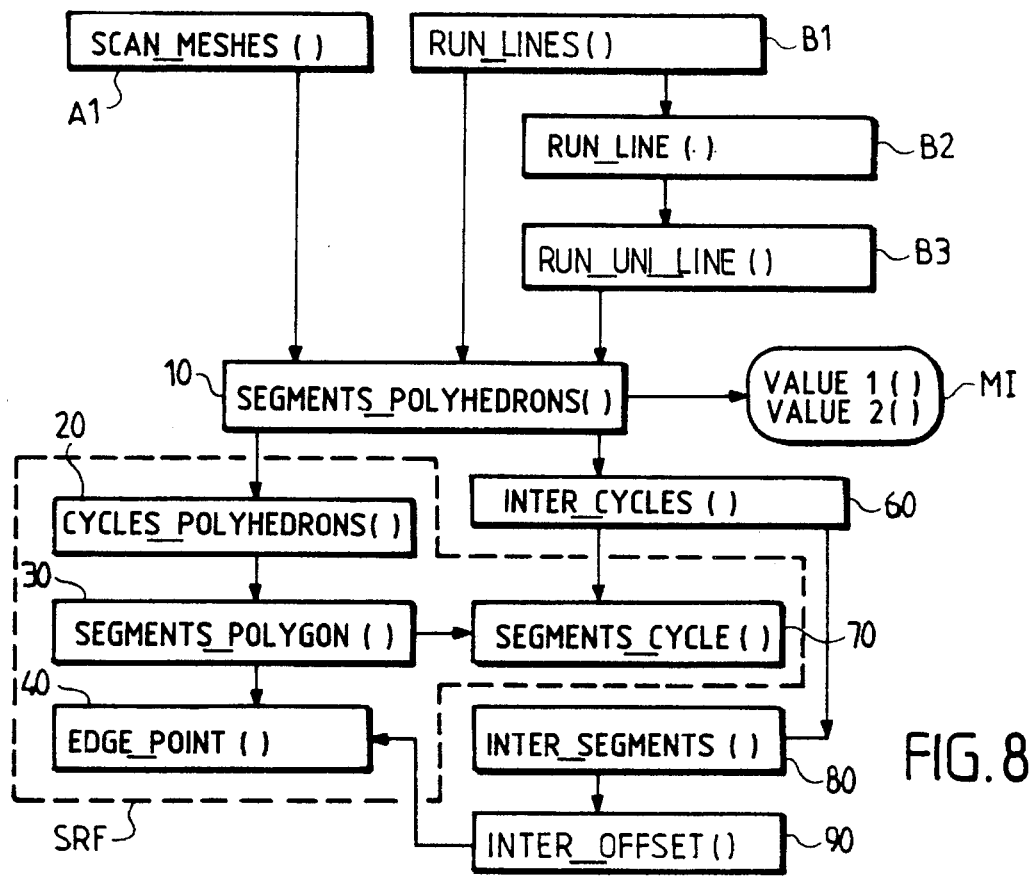
FIG. 8 is a theoretical diagram of a first embodiment of the invention.

Reference is now made to FIG. 8. What is described above corresponds to the role of the routines 20, 30, 40 and 70 of FIG. 8, isolated in the frame SRF. FIG. 8 is not the sequential diagram of a mechanism, as was the case for FIGS. 4 to 7. This FIG. 8 is an interaction diagram of the routines, the arrows being in the caller to called direction.

The person skilled in the art will understand that the list of the segments which is contained in THE_CYCLES, such as finally supplied at step 290 of FIG. 7, belongs to the iso-surface associated with the threshold S, for the portion of the space in question, and with the sampling which corresponds to the polyhedral meshing used.

Hence the blocks of the frame SRF themselves alone constitute a useful means for determining an iso-surface.

An essential advantage of this means is that it avoids (optional steps 432, 434, 442, 444 in particular) the existence of holes in the iso-surface thus determined. Another advantage is the fact that the means described are suitable for any polyhedral meshing of the space.

FIG. 8 adds other useful functions, touching, on the one hand, on different ways of using the said means (10, 60, 70, 80, 90) and, on the other hand, on different ways of exploring the portion of space in question (A1; B1 to B3).

In order to obtain significant lines, it is appropriate to construct the intersection of two iso-surfaces in the space.

In FIG. 8, the block MI corresponds to at least one image memory. More precisely:
either the block MI contains a single image memory, to which are added (preferably) converter routines named VALUE1() and VALUE2(), capable of associating two different values with each point of the image in question. One of these values is, for example, the value measured for the point of the image, and the other represents a differential characteristic of the value measured at each point, determined as will be seen later;
the block MI may also contain two image memories (then individualised into MI1 and MI2), in which case the two converter routines VALUE1() and VALUE2() may simply carry out a conversion of the measured value for each of the points of the two images in the appropriate numerical representation.

This block MI thus supplies, to a main routine 10, also named SEGMENTS_POLYHEDRON(), two different values for each point of the space, the two values being expressed in the same sampling (polyhedral meshing).

Figure 9:
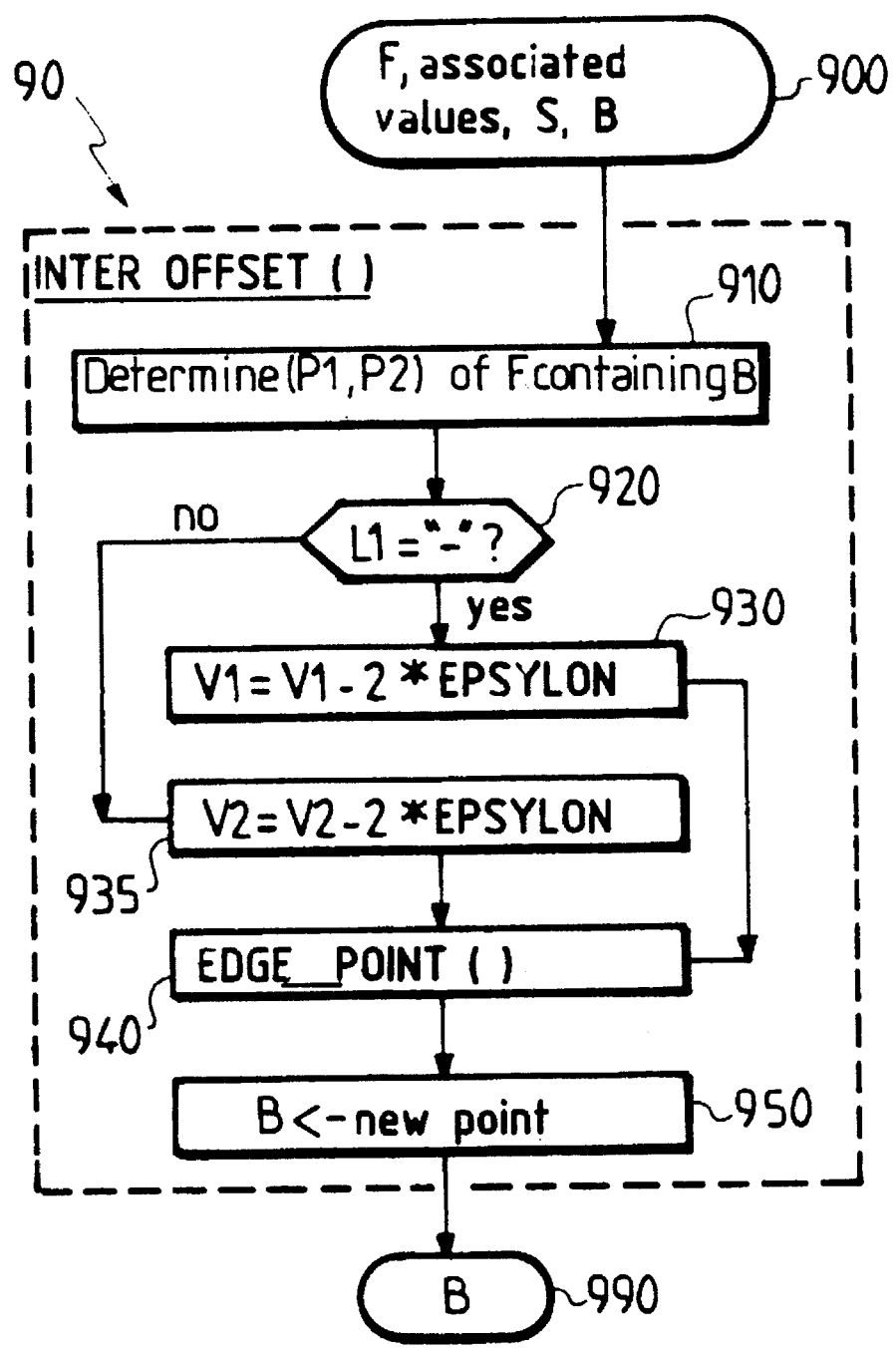
FIG. 9 illustrates a routine, called INTER_OFFSET()

FIG. 9 illustrates another basic routine, referenced 90 in FIG. 8, and named INTER_OFFSET().

The input 900 of this routine is the description of a polygonal face F of a meshing polyhedron, the values associated with each vertex of this face, the threshold value S, and the designation of a point B belonging to one of the edges of the said face F.

Step 910 determines, via its vertices P1 and P2, the edge of the polygonal face F which contains this point B. If the sign L1 associated with the point P1 is—as determined by the test 920, step 930 will reduce the value V1 associated with this point P1, and do this by twice epsilon, epsilon being the same as before. In the opposite case, step 935 will make the same reduction, but at the other extremity for the value V2 of the point P2.

After that, a call is provided for at 940 to the procedure EDGE_POINT(), in order to determine an interpolated point within the segment (P1, P2). These are the coordinates in the space of this new point, and the associated sign, which are retained for the point B sought by this routine.

In correspondence with the quantity epsilon described in connection with FIG. 4, that of FIG. 9 has the essential advantage of providing good construction of the iso-surfaces as well as of their intersections, avoiding difficulties when the extreme points of a segment are close to the threshold value.

Figure 10:
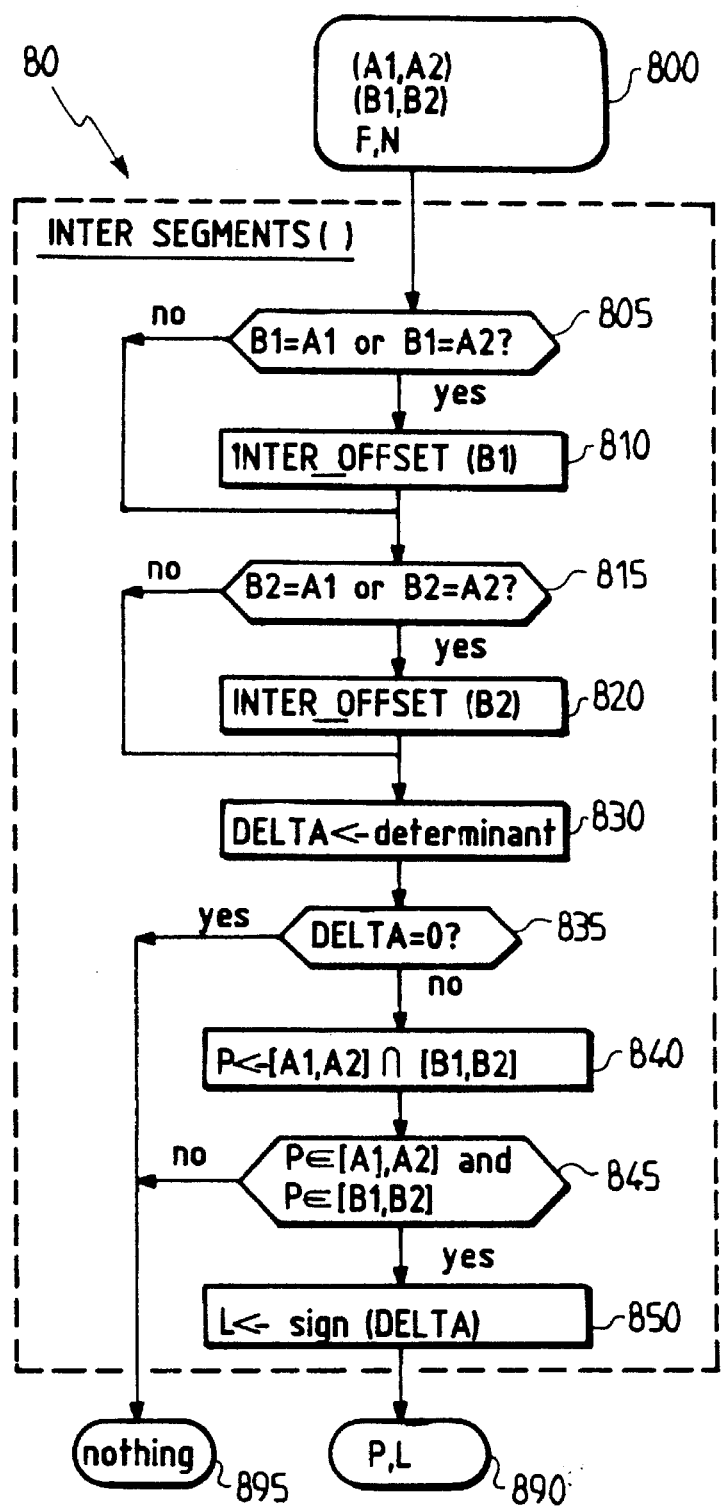
FIG. 10 illustrates a routine, called INTER_SEGMENTS()

FIG. 10 illustrates a routine 80, called INTER_SEGMENTS().

The input 800 of this routine is the designation of two segments. The extremities of the first are A1 and A2, the extremities of the second are B1 and B2. They belong to a polygonal face F of the polyhedral meshing. And the vector N normal to this polyhedral face, oriented outwards, is also designated.

The first step 805 of this routine determines whether the point B1 is coincident (or very close) with one of the points A1 or A2 of the other segment. If yes, the routine INTER_OFFSET() for this point B1 is called at 810.

Steps 815 and 820 do the same, but with the point B2.

After that comes the search for the intersection between the support lines (or axes) of the two segments (A1, A2) and (B1, B2).

One way of working is to calculate, at 830, the determinant DELTA associated with the vector (A1, A2), with the vector (B1, B2), and with the normal vector N already quoted.

The test 835 examines whether this determinant is zero, in which case there is no intersection and the routine is exited, without result, at step 895. If this determinant is not zero, this means that the support lines of the two segments cut each other. Step 840 then determines what is the intersection point P of the support lines of the two segments (A1, A2) and (B1, B2).

After that, step 845 determines whether this intersection point is indeed situated within the two segments (A1, A2) and (B1, B2) themselves. If this double condition is not satisfied, the routine is exited again at step 895. If it is satisfied, a sign, which is that of the determinant DELTA, is taken for this point P, at step 850. And the exit from the routine is the definition of the point P and of its sign L, at step 890.

Figure 11:
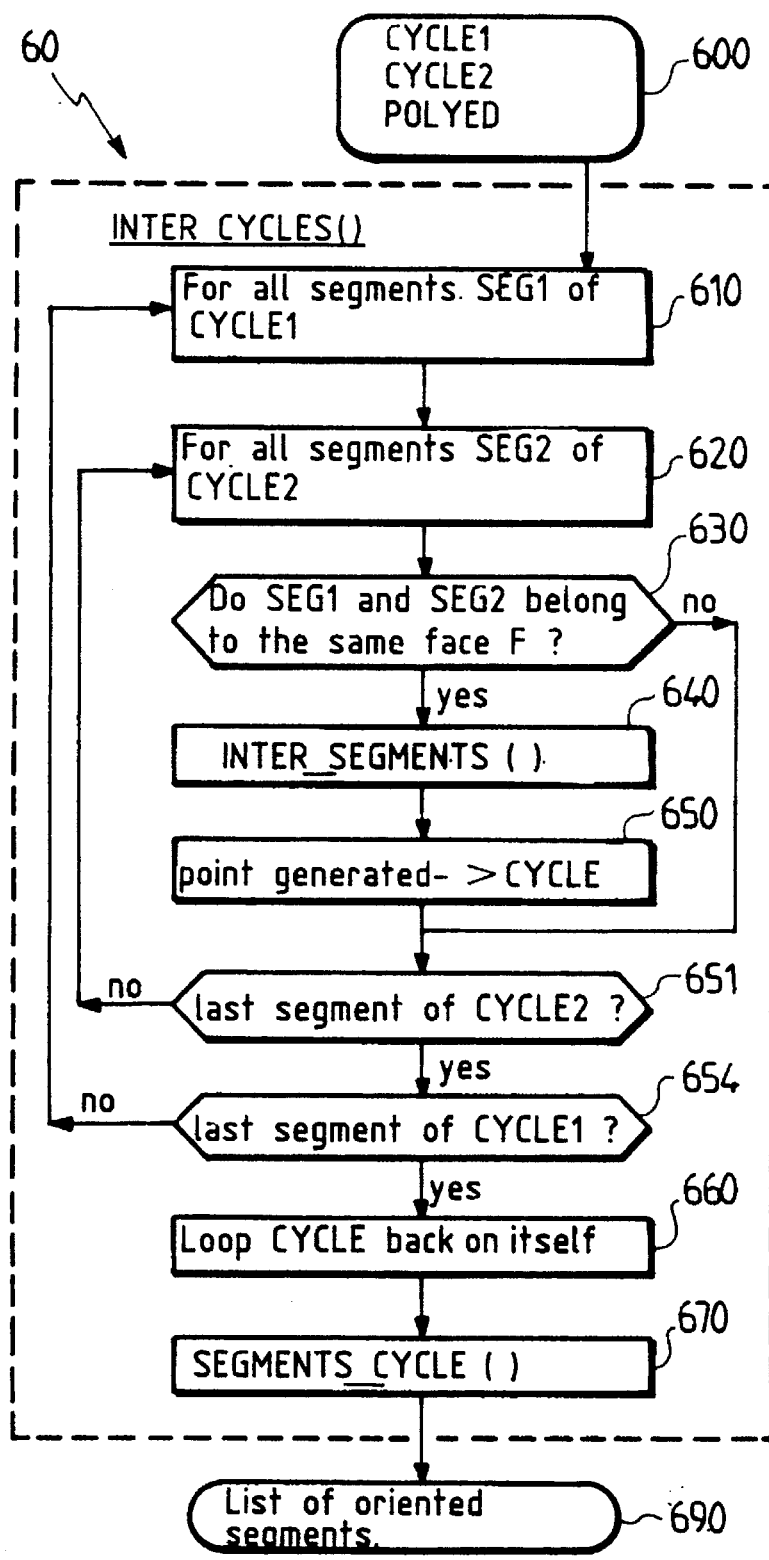
FIG. 11 illustrates a routine, called INTER_CYCLES()

Reference is now made to FIG. 11, for the description of the routine 60 of FIG. 8, named INTER_CYCLES().

The input of this routine is the definition of two cycles denoted CYCLE1 and CYCLE2 as well as of the polyhedron POLYED, to which these two cycles belong.

The two cycles, CYCLE1 and CYCLE2, are of the sort obtained at the output of the routine 20 described in connection with FIG. 7.

The first two steps 610 and 620 of the routine of FIG. 11 correspond to the scanning of all the segments SEG1 of CYCLE1 and SEG2 of CYCLE2 respectively, up to the loop ends 652 and 654.

The body of these two imbricated loops comprises:

at 630, the determination of the fact that the two segments SEG1 and SEG2 do or do not belong to the same face F of the polyhedron POLYED. If yes, the routine INTER_SEGMENTS() is called at 640.

at 650, the point supplied by this routine is placed in a list which will again be called CYCLE. (Attention is drawn to the fact that this notation is used for a clear understanding of the interactions of the various routines. But it should be clear that this list CYCLE is not the same list as the temporary list CYCLE of FIG. 7.)

After running through the two imbricated loops, step 660 carries out looping of this list CYCLE back on itself. And then, at 670, the routine SEGMENTS_CYCLE() is called, which, at 690, supplies a list of oriented segments associated with the two cycles in question.

The person skilled in the art will understand that, this time, the list of the oriented segments belongs to one and to the other of the iso-surfaces, with respective thresholds S1 and S2 of the two images MI1 and MI2. These will therefore be points of a significant line, in this example a bi-iso-line.

The main routine 10 of FIG. 8, which manages the interaction of all the routines described up to the present then remains to be described with reference to FIG. 12.

Figure 12:
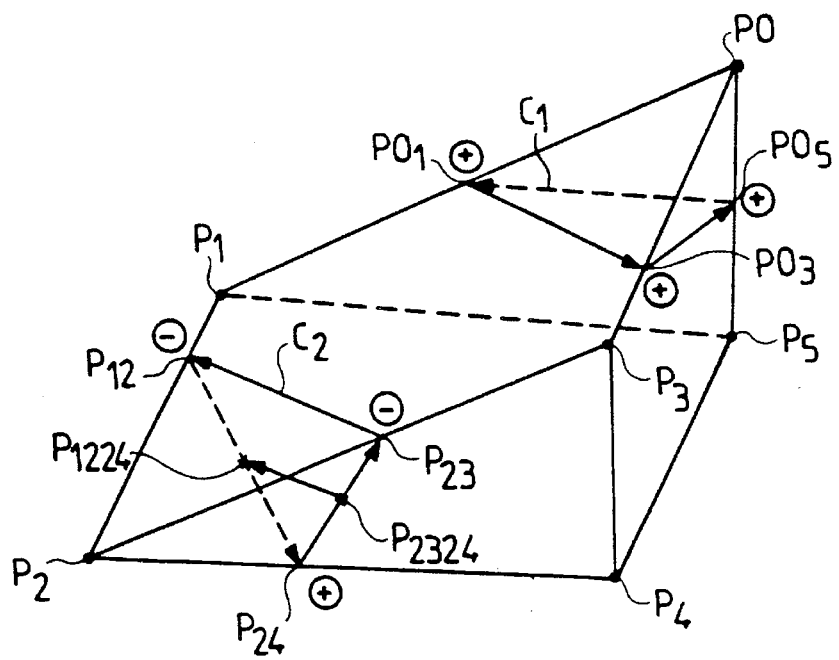
FIG. 12 illustrates a routine, called SEGMENTS_POLYHEDRONS ()

The input of the routine of FIG. 12 at step 100 is a convex polyhedron belonging to the polyhedral meshing of the space, as considered.

The first step 110 consists in calling the memory MI in order to assign, by the conversion routine VALUE1(), a measured or calculated value to every vertex of this polyhedron ("first image"). After that, step 120 calls the routine 20 of FIG. 8, with the subroutines which depend on it, in order to determine a list THE_CYCLES1, which corresponds to the iso-surface for the threshold S, relating to the first image.

Clearly, if THE_CYCLES1 is empty, that is to say that this iso-surface does not exist, it is pointless to go further, and test 125 leads directly to the exit 190 with an empty list of oriented intersection segments.

In the opposite case, steps 130 and 140 do the same thing as steps 110 and 120, but this time with the "second image" (measured or calculated) and its conversion routine VALUE2().

Similarly, if test 145 reveals that the list of cycles known as THE_CYCLES2 thus obtained is empty, there is a jump to the output 190 with an empty list of oriented segments.

The series consists in introducing a double loop running through, from 150 to 184, the list of THE_CYCLES1, and from 160 to 182 the list THE_CYCLES2. The body of these two imbricated loops consists of a call to the routine INTER_CYCLES() at step 170, with storage in memory, at 180, of the oriented segments supplied by this routine INTER_CYCLES().

These two imbricated loops having been run through, at 190 a list is obtained of oriented segments which belong to one or more significant lines common to the two measured or calculated images, in the portion of the space in question, sampled with the chosen polyhedral meshing. (Here, "two images" are spoken of; it will be seen later that there may be two different values or quantities relating to the same image).

Figure 8A:
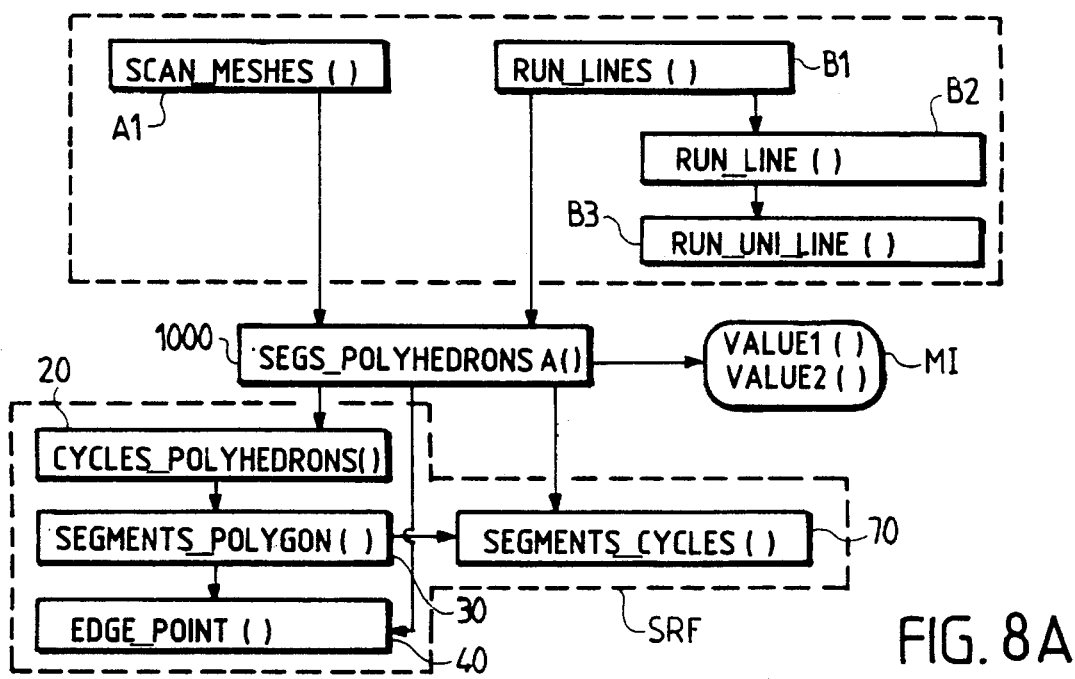
FIG. 8A is a variant of FIG. 8.

FIG. 8A presents a simplified version of FIG. 8. It is characterized in that it does without the routines INTER_CYCLES() (block 60, FIG. 8), INTER_SEGMENTS() (block 80, FIG. 8) and INTER_OFFSET() (block 90). This simplified version includes the same iso-surface calculating block SRF as the version of FIG. 8, as well as the same modes of exploring the space (A1; B1 to B3). It differs, however, in that it includes a single block 1000 or SEGS_POLYHEDRONS_A() in the place of blocks (10, 60, 80, 90) of FIG. 8.

The person skilled in the art will understand that this modification gives rise to a great simplification in the technique employed, with a counterbalancing less good approximation of the significant lines reconstructed.

Figure 12:
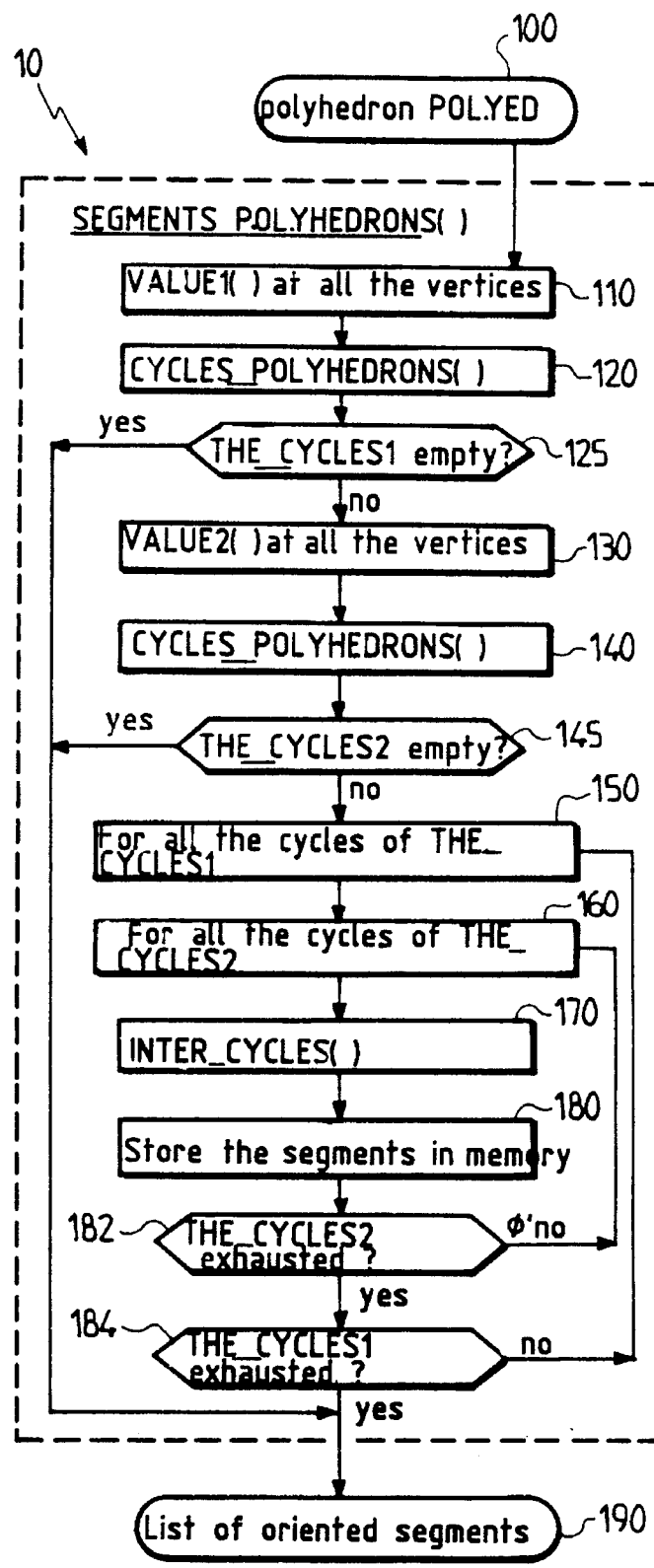
Figure 12A:
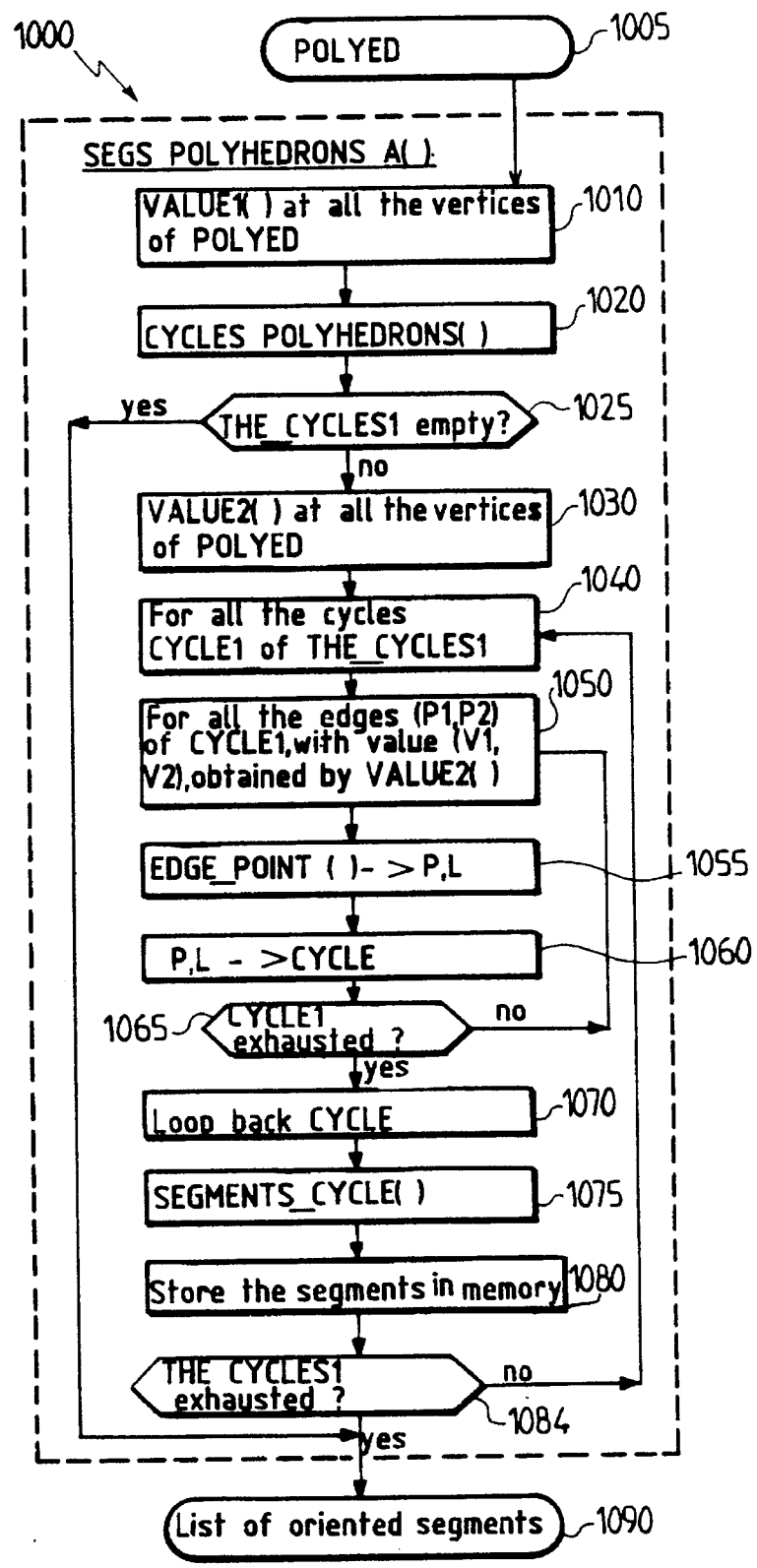
FIG. 12A is a variant of the routine of FIG. 12.

FIG. 12A illustrates the routine 1000 or SEGS_POLYHEDRONS_A() of FIG. 8A in more detail. Just like SEGMENTS_POLYHEDRONS(), this routine takes a polyhedral mesh POLYED (block 1005) as its input and returns (1090) the list of the oriented segments corresponding to the bi-iso-lines passing through this polyhedron.

Blocks 1005 to 1030 of FIG. 12A are exactly the same as blocks 100 to 130 of FIG. 8. The difference is that now the routine CYCLES_POLYHEDRONS() is not relaunched for the values calculated by VALUE2(). At this stage, the routine SEGS_POLYHEDRON_A() successively reviews all the cycles CYCLE1 of the list THE_CYCLES1 between the blocks 1040 to 1084; for each cycle CYCLE1, the routine successively considers (blocks 1050 to 1065) all the edges (P1, P2) of this cycle, as well as the two corresponding values (V1, V2), both calculated with the aid of VALUE2()—(it is important to note that, from step 1020, no further use is made of the values calculated by VALUE1()).

P1 and P2 belong by construction to the edges of POLYED. Thus it is easy to calculate by interpolation, for example by linear interpolation, the value V1 for P1 and the value V2 for P2, from the values at the vertices of POLYED obtained with the aid of the routine VALUE2().

The routine then calls (block 1055) the routine EDGE_POINT() or 40 (FIG. 4), which makes it possible to calculate, if appropriate, a new point P interpolated between P1 and P2, having a label L. This new point, if it exists, is placed in an intermediate list of points called CYCLE, at block 1060.

After consultation of all the edges of CYCLE1, a new intermediate list of points CYCLE has thus been constituted, which is reclosed on itself at the level of the block 1070. Next the routine SEGMENTS_CYCLE() (block 1075) is called. It transforms CYCLE into a list of oriented segments. These segments are either sent directly for display or stored in memory in a list of segments at block 1080. The intermediate list CYCLE is then deleted, and looping back (1084) goes on until the cycles of the list THE_CYCLES1() are exhausted.

The output of this routine is the list of oriented segments thus constituted, if the latter have not been sent directly for display.

This example is based on that of FIG. 7A, in which the cycles corresponding to the values of VALUE1() have already been calculated. Next the values at the vertices P0 to P5 are calculated with the aid of VALUE2(). Then the interpolated values at the points (P12, P24, P23) and at the points (P01, P03, P05). By comparing the values obtained with respect to the threshold S2, the labels indicated in FIG. 12B are obtained, and thus 0 generated segments are obtained for the cycle C1 and the oriented segment P2324, P1224 for the cycle C2.

The application of the routines described above will now be considered, in different variants.

As already indicated, several ways exist for making use of the results thus obtained, in particular either displaying them, or using them to compare two images.

In the case of a display, the order in which the information is available is of little consequence. It is, naturally, not the same in the case of a comparison of images.

Figure 13:
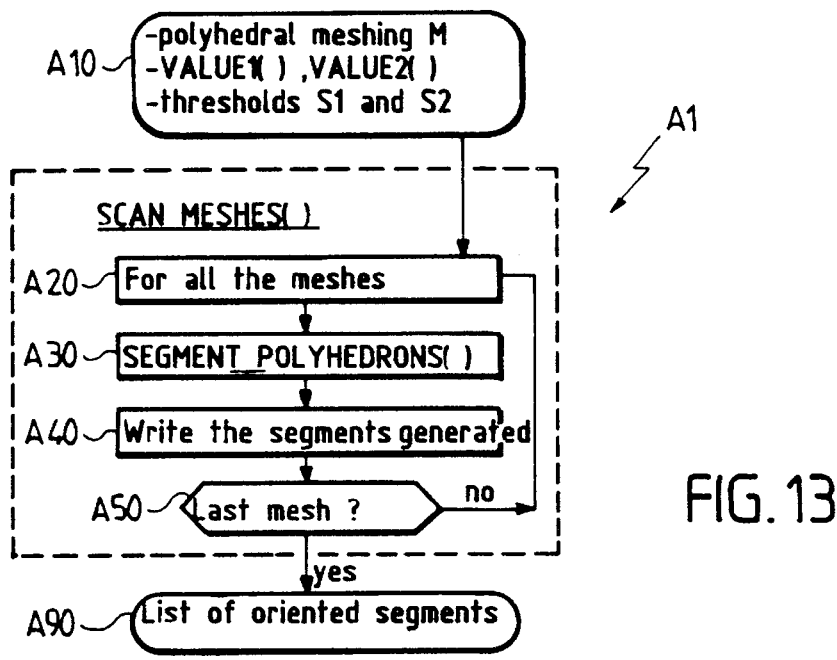
FIG. 13 illustrates a routine, called SCAN_MESHES()

When the order in which the graphical information is presented for display on the visual display screen is not of major importance, it is possible to make use of the routine A1 of FIG. 8, which is illustrated in more detail in FIG. 13, under the title SCAN_MESHES().

The input A10 of this routine is the definition of a polyhedral meshing of a portion of the space. The conversion routines VALUE1(), VALUE2() are, moreover, also available for converting the information of values associated with each node of the polyhedral meshing into the appropriate numerical form. Two threshold values S1 and S2 are added thereto. A loop going from A20 to A50 will be able to describe all the meshes of the portion of space in question. For each mesh, step A30 calls the main routine 10 or SEGMENTS_POLYHEDRON().

The latter supplies a list of oriented segments, which is stored in memory at step A40 or even (for example) directly transmitted to a monitor for visual display.

The output A90 corresponds to this list of oriented segments, which may now be visually displayed if it has not so been directly.

In other cases, an individual tracking from end to end of significant lines may be required. Use is then made of the routines B1 to B3 of FIG. 8 which will now be described by reference to FIGS. 14 to 16, respectively.

The input B100 of the routine B1 (FIG. 14) contains the definition of a stored list of meshes M', corresponding to the starting meshes of the lines sought, defined with respect to a polyhedral meshing M, with, at each node of the list of meshes of the meshing, a definition of two values by the abovementioned conversion routines VALUE1() and VALUE2(). The definition of two thresholds S1 and S2 is added thereto.

A main loop is set up between steps B110 and B180. The first step of this loop consists (B120) of the call to the main routine SEGMENTS_POLYHEDRON() or routine 10 of FIG. 8. The latter supplies, for the current mesh, a list of oriented segments.

An internal loop then extends between steps B130 and B170. For each segment contained in the list, a call is made at B140 to a procedure RUN_LINE() which will be described later. This procedure adds the line which it calculates to a list of lines denoted LLIST, which it does at step B150.

The final result at B190 is a list of significant lines LLIST.

Figure 15:
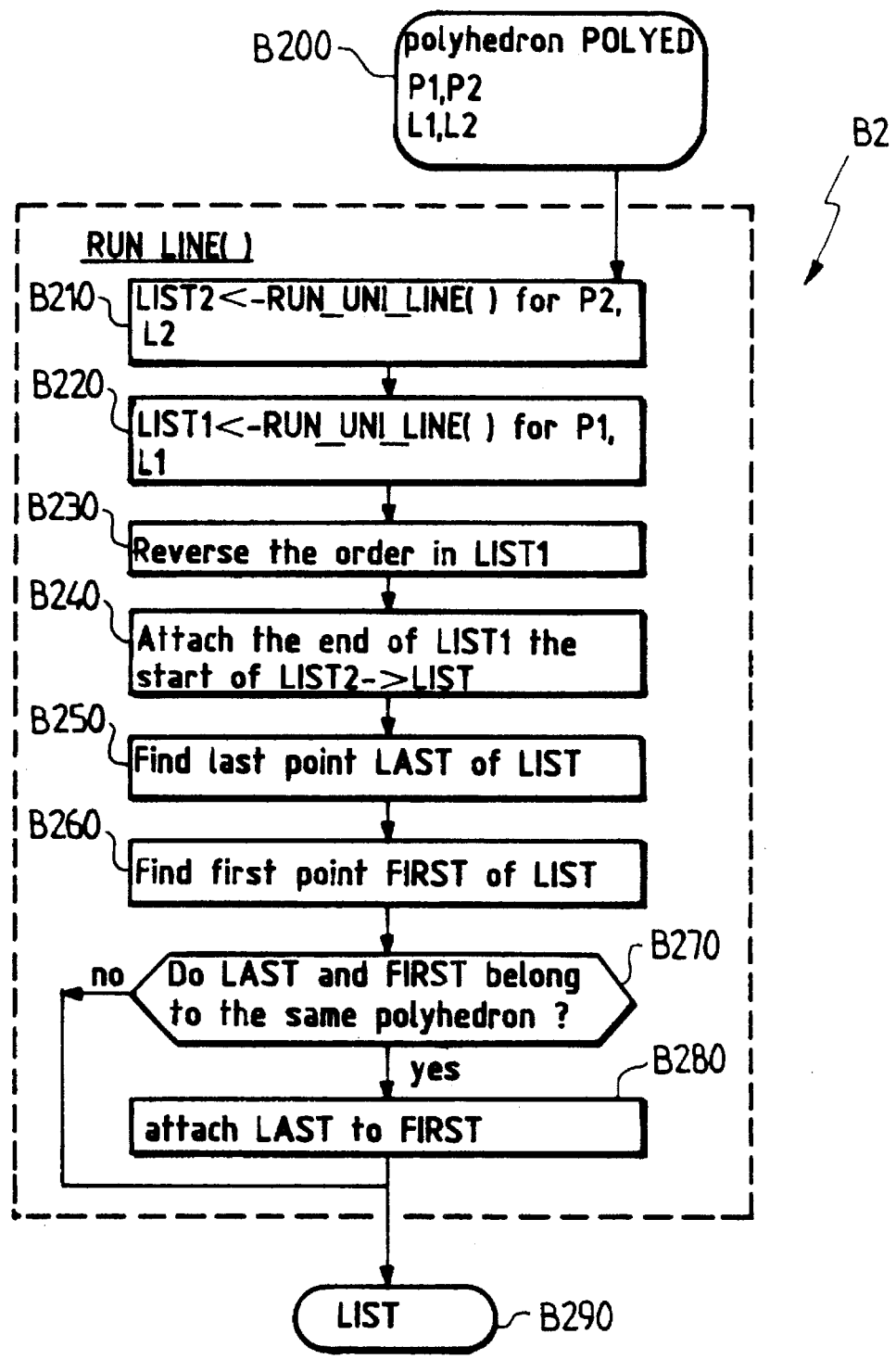
FIG. 15 illustrates a routine, called RUN_LINE()

In FIG. 15, the input B200 of the routine RUN_LINE() receives a polyhedron POLYED, two points P1 and P2 belonging to an edge of this polyhedron, and their respective signs L1 and L2.

Step B210 calls another routine RUN_UNI_LINE() for point P2 with its direction or sign L2, which it does to set up a first list of points constituting a significant line starting from P2, denoted LIST2.

Step B220 does the same, but with point P1 and its direction L1, in order to fill up another list of points, denoted LIST1, starting from P1.

Step B230 consists of a reverse-order sort of LIST1.

Step B240 carries out a concatenation adding LIST2 to the end of LIST1 (reversed). The concatenated result only is processed afterwards, under the name of LIST, which represents the significant line passing through the points P1 and P2.

Next, step B250 searches for the last cell of LIST (in fact, the last of LIST2), which is denoted LAST. Step B260 searches for the first cell of LIST (in fact of LIST1 reversed), which is named FIRST. Step B270 determines whether the two points LAST and FIRST belong to the same polyhedron.

If yes, the point LAST is attached to the point FIRST, and LIST is closed. If not, LIST is open. LIST is the result at step B290; it represents a line which is either closed on itself, or open.

The person skilled in the art knows moreover that it is possible to construct, in image processing, what is known as a "hashing table". This is a digital processing tool which allows data associated with points of an any-dimensional space to be very easily stored in memory and recovered.

The routine RUN_UNI_LINE() will now be described with reference to FIG. 16. It bears the reference B3 in FIG. 8, and the numerical references of FIG. 16 consequently all start with B3.

The input stage B300 consists in receiving the definition of a polyhedron POLYED, as well as of a point P with its sign or direction L.

Step B305 consists in preparing a list, initially empty, under the heading PTR.

A hashing table H is available, assumed to be empty.

The test 310 will search to see whether the point P given as input is already in this hashing table. (This condition is naturally not satisfied at the start.)

If it is not satisfied, the point P is added to the end of the list PTR at step B320. At step B322, it is added to the hashing table.

At step 325, the face F of the polyhedron POLYED which contains the point P is sought.

In accordance with the known description of the polyhedral meshing of the space, step B330 determines another mesh POLYED2, which satisfies the condition of sharing this same face F with the polyhedron POLYED which is under consideration.

Test B335 determines whether this polyhedron POLYED2 is outside the meshing M (outside the portion of the space processed).

If it is contained in the meshing, this polyhedron POLYED2 is taken in place of the polyhedron POLYED in question, at step B340, and step B345 consists in executing the main routine SEGMENTS_POLYHEDRON() on this new polyhedron.

Next, for all the points P1 and P2 in the list generated by this call to the routine SEGMENTS_POLYHEDRON, a check is done at B355 as to whether the sign of the point is "−". According to whether it is "+" or "−", step B362 or B364 will check whether P coincides with P1 or P2 respectively, in which cases P2 and P1 are taken as point P respectively, at steps B366 and B368.

This carries on until analysis of the last segment of the list set up by step B345 in order to given a final list PTR at B390.

Meanwhile, a looping has been carried out between the outputs of the steps B366 and B368 and step B310. The non-processed outputs of the steps B310 and B335 are expressed by a direct output at B395, with the list PTR as it exists up to the present.

The person skilled in the art will understand that, in contrast with routine A1, the routines B1 to B3 thus described in detail allow an exploration to be carried out along the significant lines of the portion of space which is under consideration.

Figure 14:
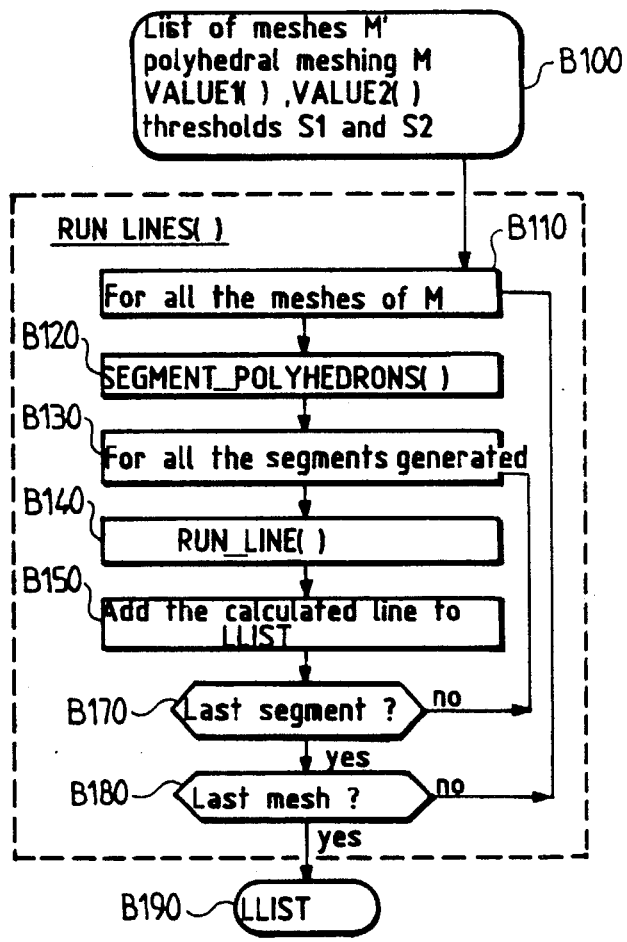
FIG. 14 illustrates a routine, called RUN_LINES()

Obviously, various ways exist of defining the set of starting meshes M', at the entry B100 of the routine of FIG. 14. It is first of all possible to review all the meshes of M sequentially. It is equally possible randomly to draw the coordinates of a given number of starting meshes M'. It is further possible to leave a user to designate M' by any appropriate means.

The foregoing defines, for any polyhedral meshing of the space:

an advantageous means (20, 30, 40, 70) for determining an iso-surface for an image;

a novel means for determining significant lines such as bi-iso-lines (10, 20, 30, 40, 60, 70, 80, 90);

two exploration modes (A1; B1 to B3) of one or two images, usable at will according to the application.

In a first embodiment variant (FIG. 17), the meshing of the space consists of identical cubes, also known as "voxels".

This then results in simplifications of the general case which has just been described.

First of all, the numbers of cycles and of segments which will be generated for each voxel have known maximum values. This results in the possibility of managing the memory necessary for implementing the invention without a dynamic memory allocation mechanism.

The routine SCAN_VOXEL() 1400 (A1, FIG. 8) does not require any dynamic management of the memory. On the contrary, it works with the aid of a memory-stored table of fixed size, since it consists simply in sequentially reviewing all the voxels contained in the portion of space in question, meshed by a regular three-dimensional grid, for example a cubic mesh. (The word cubic extends in the rest of the text to any parallelepiped-shaped mesh; the person skilled in the art knows that there always exists an isomorphism capable of getting from a parallelepiped to a cube.)

Moreover, in the routine 1430 (or B3, FIG. 8), the search for the voxel adjacent to the voxel in question is direct.

For its part, the main routine SEGMENT_VOXEL() here denoted 1440 (corresponding to 10, FIG. 8), will now generate six oriented segments at most, which again leads to simplifications as far as the management of the memory is concerned. Briefly, it twice executes the routine CYCLES_VOXEL() or 1445 for the two sets of defined thresholds and values, so as to generate the two lists of oriented cycles THE_CYCLES1 and THE_CYCLES2. Each list of cycles thus obtained is constituted of four cycles at most, each having twelve vertices at most. Moreover, the total number of vertices in a list of cycles does not exceed twelve.

Each of these cycles represents a small piece of the iso-surface defined by trilinear interpolation from values of the eight vertices of the cube. More precisely, the points of each of these cycles correspond to the intersection of this iso-surface with the edges of the elementary cube in question.

Figure 17:
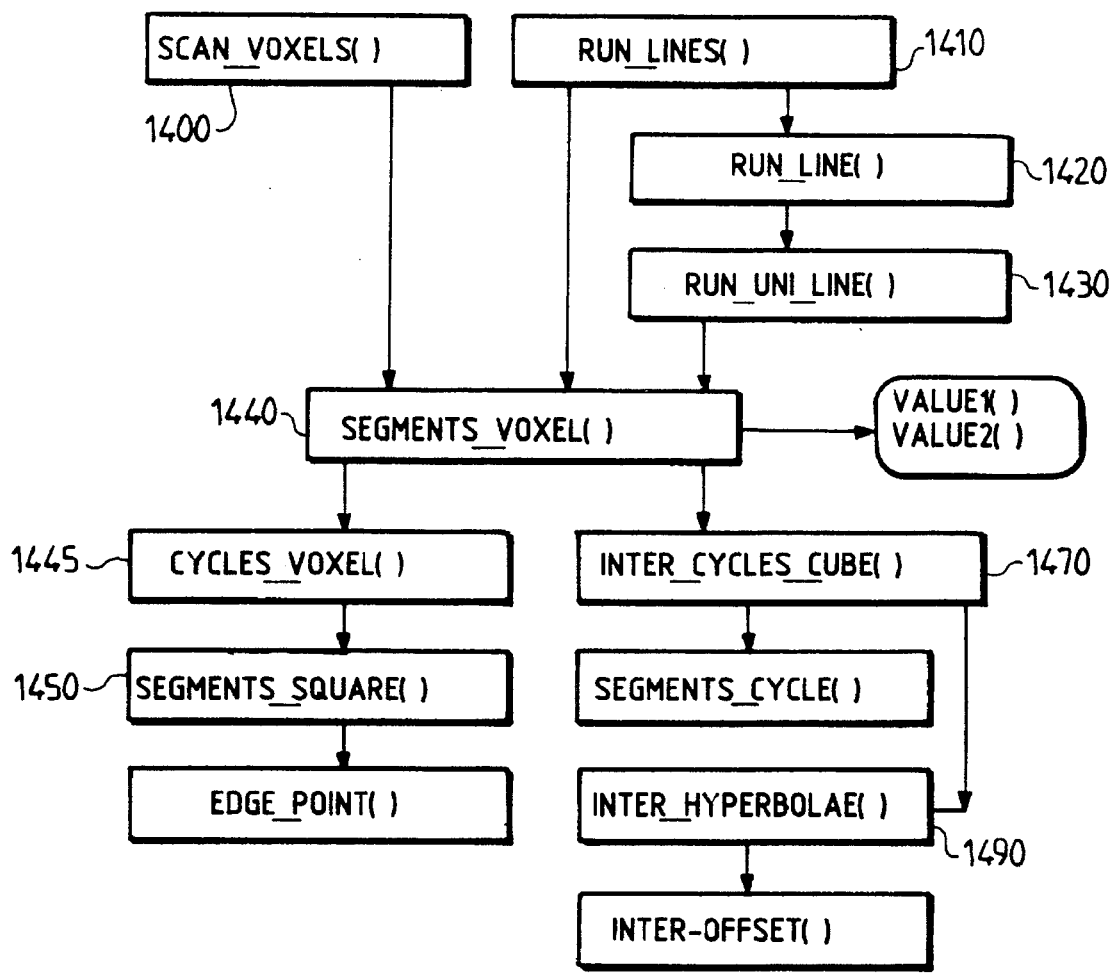
FIG. 17 is a theoretical diagram of a second embodiment of the invention, adapted to the case of a regular grid (a single type of parallelepipedal polyhedron )

The routine CYCLES_VOXEL() or 1445 of FIG. 17 takes as its input the coordinates of the voxel, as well as the eight values associated with its eight vertices, and the threshold or iso-value S in question. This routine will successively consider each of the six faces of the cube or voxel, constituting a table of four values each time, corresponding to the four vertices of the square (parallelogram) which the face of the cube (parallelepiped) in question constitutes. The order of the values is of importance, and must be such that the direction of travel of the square defined by the rule known as corkscrew rule gives an orientation which points towards the outside of the cube. The routine SEGMENT_SQUARE() or 1450 is called once for each face of the cube. It returns two segments at most, each formed by an ordered pair of points of the three-dimensional space.

The extremities of these two segments correspond to the intersection of the iso-surface with the four edges of the cube belonging to this face.

The applicant has observed that in reality the exact intersection of the iso-surface based on the trilinear interpolation with the face of the cube is a hyperbola which may constitute at most two separate branches. Consequently, it is judged that the segments reconstructed by this routine SEGMENT_SQUARE() should be considered as approximations of these hyperbola branches, approximations which coincide exactly with the segments, but only in the region of the edges of the cube.

After the six calls to the routine SEGMENTS_SQUARE() or 1450, twelve oriented segments at most are obtained which make it possible, as for the routine CYCLES_POLYHEDRON(), to reconstitute cycles winding around the voxel, by comparison of the extremities of the segments. There exist four distinct cycles at most. The routine CYCLES_VOXEL() or 1445 returns all the cycles thus constituted.

The nature of the routine SEGMENT_SQUARE() 1450 can be further specified. In fact, it has four values V1 to V4 as input, taken in an ordered fashion, and corresponding to the four vertices of a square.

It is then possible to consider directly all the possible cases of distribution of the labels or signs at the vertex of the square. The four vertices each in effect receive a label which is "−" if the value associated with the vertex is less than or equal to the iso-value or threshold in question S, and "+" in the opposite case. There thus exist sixteen possible cases at most as far as the attribution of the labels to the four vertices of a square is concerned.

It is then sufficient to constitute a four-bit word, called "code" word, by using the labels of the vertices, in the order of travel of the square, from the most significant bit to the least significant bit, as illustrated in the various drawings of FIG. 18.

Figure 18A:
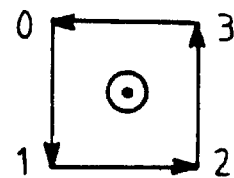

FIG. 18A indicates the direction of travel of a square in accordance with the corkscrew rule already mentioned: when the square is travelled in the counter-clockwise direction, the normal to the square is assumed to be oriented towards the front of the Figure. The order of the bits in the direction of significance goes from 0 to 3.

When a vertex of a square is associated with the label or sign "+", it is represented by an empty circle. In the opposite case, it is represented by a filled-in circle (label "−" or 0).

Figure 18B:
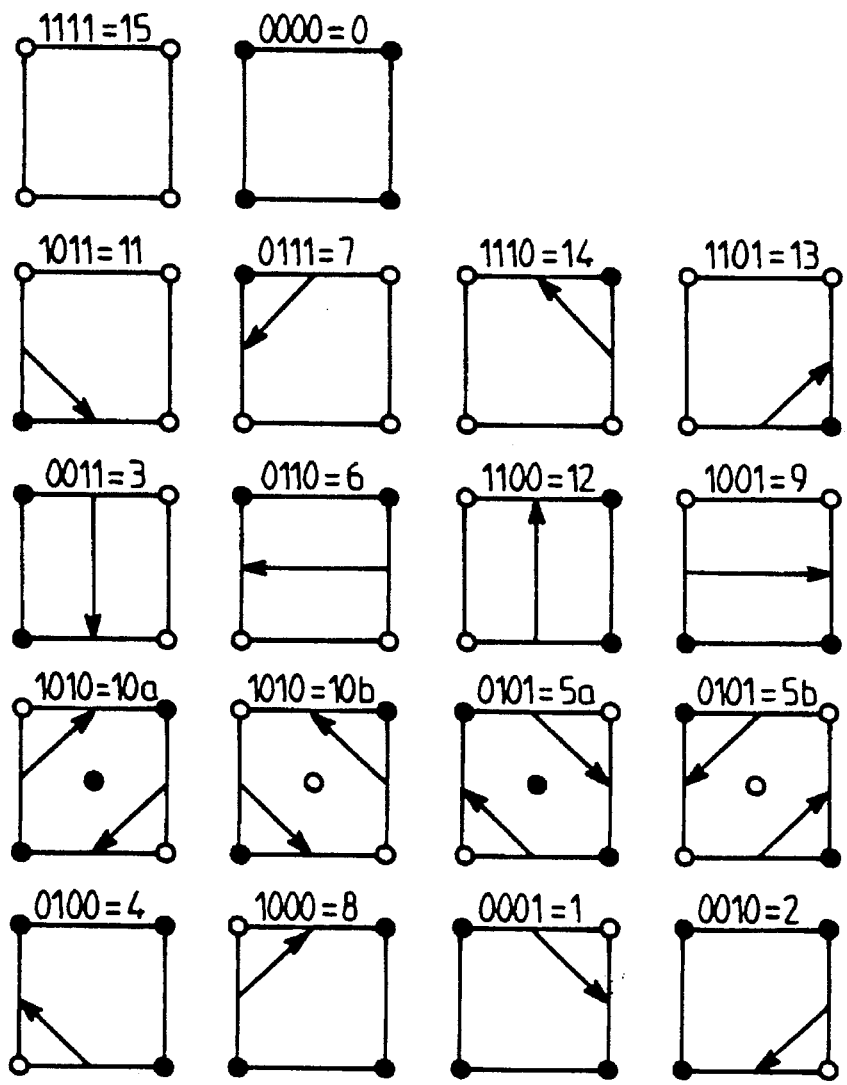

According to FIG. 18B, the codes 0 or 15 correspond respectively to four vertices with label "−" or four vertices with label "+". In this case, the routine SEGMENT_SQUARE() stops, not returning any segment.

As before, the routine EDGE_POINT() is executed for each edge of the square which exhibits vertices having opposite labels. This makes it possible to generate four intermediate points at most, each corresponding to the intersection of the iso-surface defined by trilinear interpolation with the corresponding edges of the voxel.

It is then pointless to call the routine SEGMENTS_CYCLE(), as will now be seen.

In fact, the link indications between the vertices suffice to define the largest part of the binary codes, or of their hexadecimal equivalent, which is used here in the description.

The particular cases relate to the codes 5 and 10, for which an ambiguity exists. This ambiguity is resolved by considering the sign of the label L which can be associated with the mean of the values existing respectively at the four vertices of the square. This label is, for example, "−" if this mean $V=(V1+V2+V3+V4)/4$ is less than or equal to the iso-value S; it is "+" if V is greater than S.

The case of the code 5 thus breaks down into two cases 5a and 5b. Similarly, the case of code 10 breaks down into two cases 10a and 10b.

Thus in total there are obtained 18 cases of possible links within a square face of the voxel.

The person skilled in the art will have noted that the various links thus generated are the same as those which would have been produced by the routine SEGMENTS_CYCLE(), except for cases 5 and 10 which have just been examined. These two cases constitute a significant characteristic of the routine SEGMENTS_SQUARE() with respect to SEGMENTS_POLYGON(). The modification which they imply has the particular aim of producing a polygonal meshing of the corresponding iso-surface, doing so with the same topology as the iso-surface defined by the trilinear interpolation. In effect, if the orientation of the face F is changed, the links constituted remain the same while simply changing direction.

Finally, it is useful to associate, with each edge, a reference to the face F, this time in the form of a code denoted ORI, lying between 1 and 6, which designates the orientation of the face of the cube which contains the segments in question.

The routine SEGMENT_SQUARE() then supplies, as result, the set of these oriented segments, which are a maximum of two in number.

In the right hand part of FIG. 17, under the routine 1440, the same routines could again be used there as in FIG. 8. But simplifications are useful.

In place of INTER_CYCLE(), a useful variant named INTER_CYCLE_CUBE() consists in providing for at most six oriented segments to be supplied, returned as direct result to the routine SEGMENTS_VOXEL().

Moreover, it is possible to replace the routine INTER_SEGMENT() by INTER_HYPERBOLE() or 1490.

This new routine takes as its input two oriented segments SEGMENT_A and SEGMENT_B, formed by two ordered pairs of points (A1, A2) and (B1, B2), as well as two ordered lists of the four values (V11, V12, V13, V14) and (V21, V22, V23, V24), associated with the face F which contains these segments, and corresponding respectively to the two sets of values and to the two thresholds. INTER_HYPERBOLE() still uses the index "ORI" which indicates the orientation of the face F in question in the cube or voxel, among the six possible orientations. This index ORI makes it possible immediately to discover which is the direction N of the normal associated with the face F.

In order to avoid degenerate intersection cases, a call to the routine INTER_OFFSET() makes it possible, if need be, to slightly move the points B1 and/or B2 in the event of coincidence with A1 or A2.

Next the intersections of the two hyperbolae defined by bilinear interpolation from the values (V11, V12, V13, V14) and (V21, V22, V23, V24) are calculated exactly. (In the event of any parallelepipeds—not rectangular—, the hyperbolic interpolation is applied by locally reverting to a square shape, by changing index value—the abovementioned isomorphism.)

Figure 17A:
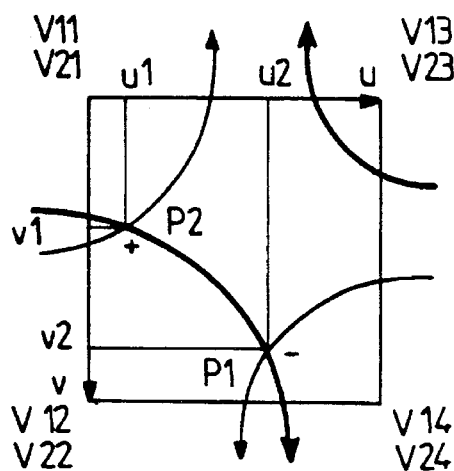
FIGS. 17A, 18A and 18B are drawings useful for understanding FIG. 17.

One way of calculating these intersections consists in resolving the system of equations given at Appendix I, formula (XVIII). Reference is also made to FIG. 17A.

The coordinates u, v are the coordinates of the points of intersection, in the two-dimensional reference system associated with the face F. They are obtained by eliminating the product uv from the equation system (XVIII) by multiplication of the first equation by V23+V21−V24−V22, and of the second by V13+V11−V14−V12, and by constructing the difference between the two equations thus multiplied. This results in knowledge of v as a function of u. v is replaced by this value in one of the two equations, which gives an equation of the second degree in u, able to lead to two intersection solutions, which supplies at most two possible intersection points P1 and P2.

If this calculation supplies zero or a real solution, then the routine INTER_HYPERBOLE() stops, not returning any new point. If it supplies two real solutions, each of these points P1 and P2 is assigned a label or sign which corresponds to the sign of the determinant of the matrix formed:

by the tangent vector, at the point P1 or P2 in question, on the hyperbola defined by V11, V12, V13, V14, by the tangent vector at this same point P1 or P2 to the hyperbola defined by V21, V22, V23 and V24, and by the normal N to the face in question.

The routine INTER_HYPERBOLE then returns the intersection points thus calculated, which indeed belong to the parts of the hyperbola branches defined on the one side by (V11, V12, V13, V14) and on the other by (V21, V22, V23, V24), limited respectively by the segments A1, A2 and B1, B2, and does so in their order of appearance along the hyperbola branch (A1, A2).

It will be observed that the face F is able to belong to two different voxels of the three-dimensional grid forming the basic meshing. However, as for the case of the routine INTER_SEGMENT(), the result is independent of the orientation of the face F, with the exception of the labels associated with the new points created, and of their order of appearance, which is reversed.

The position of these new points is the same in both possible orientations of the face in question. This guarantees the continuity of the bi-iso-lines reconstructed.

The explanation of that resides in the fact that the intersections are calculated from values (V11, V12, V13, V14) and (V21, V22, V23, V24) associated with the vertices of the face, and which do not depend on the orientation of this face.

Finally, contrary to the case encountered by constructing the intersection of segments, the points calculated by the routine INTER_HYPERBOLE() belong exactly to the bi-iso-lines defined by trilinear interpolation on the voxels.

Finally, the procedure INTER_HYPERBOLE() therefore returns 0, 1 or 2 intersection points, each complete with a label "−" or "+".

Another variant of the invention uses a tetrahedral meshing of the space.

Figure 19:
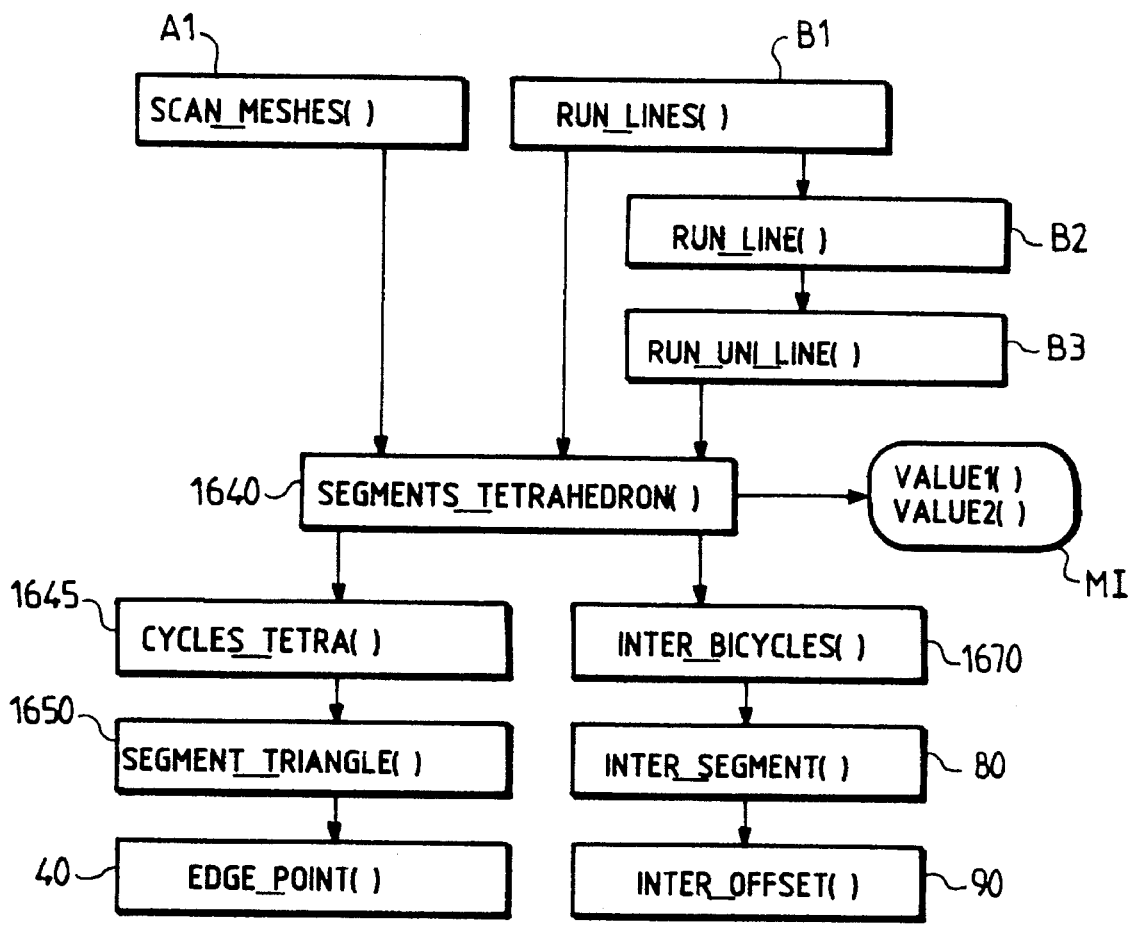
Figure 19A:
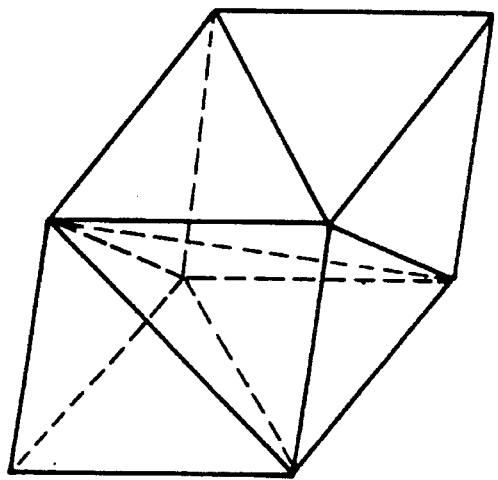
FIG. 19A illustrates a tetrahedral meshing.

FIG. 19A shows how a basic mesh with five tetrahedrons may represent a parallelepiped, whose ability to completely fill the space will be immediately understood.

The overall mechanism for extracting the significant lines is then illustrated in FIG. 19. The blocks A1, B1, B2, B3 and MI, as well as 40 and 90 of the latter, may be the same as in the general case of a polyhedral meshing.

The routine SEGMENT_TETRAHEDRON() 1640 is in contrast modified with respect to SEGMENT_POLYHEDRON().

In fact, with a tetrahedral basic polyhedron, this routine 1640 will supply two oriented segments at most. To this end, the routine 1640 twice calls a routine 1645 or CYCLE_TETRA(). The latter is a simplified version of the routine 20 of FIG. 7: in fact, it takes as input a tetrahedron TETRA, a list of values each associated with one of the vertices of the tetrahedron, and a threshold or iso-value S.

The subroutine called, in place of SEGMENT_POLYGON() of FIG. 6, is simplified into SEGMENT_TRIANGLE(). This routine has as its input a triangular face of the tetrahedron (three points and the three associated values) and a threshold or iso-value S. It returns zero or an oriented segment. It will be understood in this case that it is not at all necessary to make a call to the routine 70 in order to run through these segments.

The first step of this routine SEGMENT_TRIANGLE() consists in calculating a three-bit code for the triangle, in the same way as was previously described for the case of the square, but with only three vertices. There remain only the eight possible cases of FIG. 20B. The travel round the tetrahedron is illustrated in FIG. 20A, with the same representation conventions as before (in FIG. 18).

Figure 20:
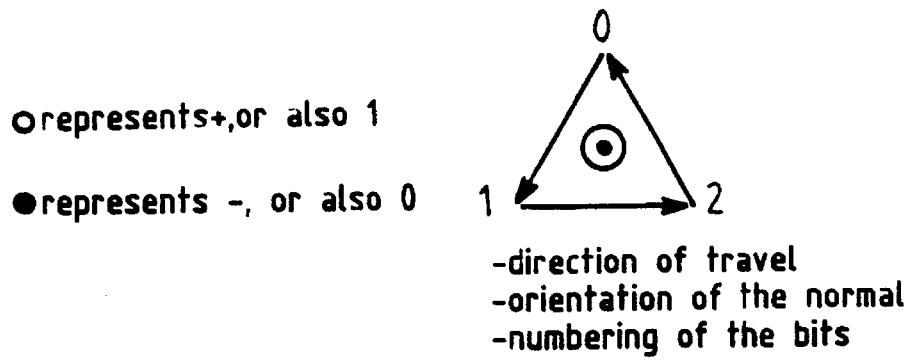
FIGS. 20A and 20B are drawings useful for understanding FIG. 17.
Figure 20:
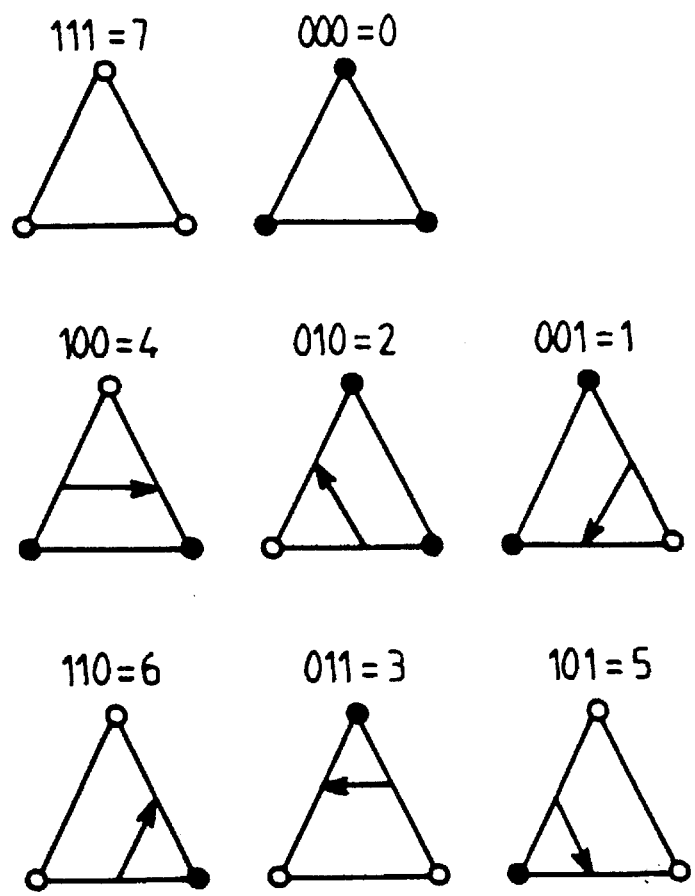

In FIG. 20B, cases 0 and 7 (in hexadecimal) are those in which no segment is generated. In the other cases, the routine EDGE_POINT() 40 is called only for two of the three edges. This in effect suffices to determine the segment sought.

A variant consists in directly examining the 16 possible cases for the distribution of the labels at the four vertices of the tetrahedron, in which case it is no long at all necessary to call the procedure 40 or EDGE_POINT().

In the right hand part of FIG. 19, simplifications also arise. In effect, the routine INTER_CYCLES() referenced 60 in FIG. 8 may be replaced by a variant 1670 in FIG. 19, denoted INTER_BICYCLES(). This variant takes account of the fact that the cycle generated in CYCLE can only have 0, 2 or 4 vertices (segment extremities). It dispenses with the call to the routine SEGMENTS_CYCLE().

In the case without any vertex, there cannot be any segment. If CYCLE has two vertices, the corresponding segment, oriented from the label "−" to the label "+", is returned as result. If CYCLE has four vertices, then the segments are constituted according to the link rules of the square, as defined in FIG. 18B, and by using the mean of the four associated values in order to resolve the ambiguity of the cases of code 5 and 10, as already described.

Attention will now focus on a particularly useful variant of the invention.

In the foregoing, the conversion routines VALUE1() and VALUE2() were assumed to process data relating to two different images.

In what will now be described, one of the two routines continues to supply a measured quantity relating to an image. The other routine supplies a differential quantity relating to the said measured quantity.

A routine which can be used to this effect is that named EXTRACT_CURVES(), which will now be described with reference to FIG. 21.

Figure 21:
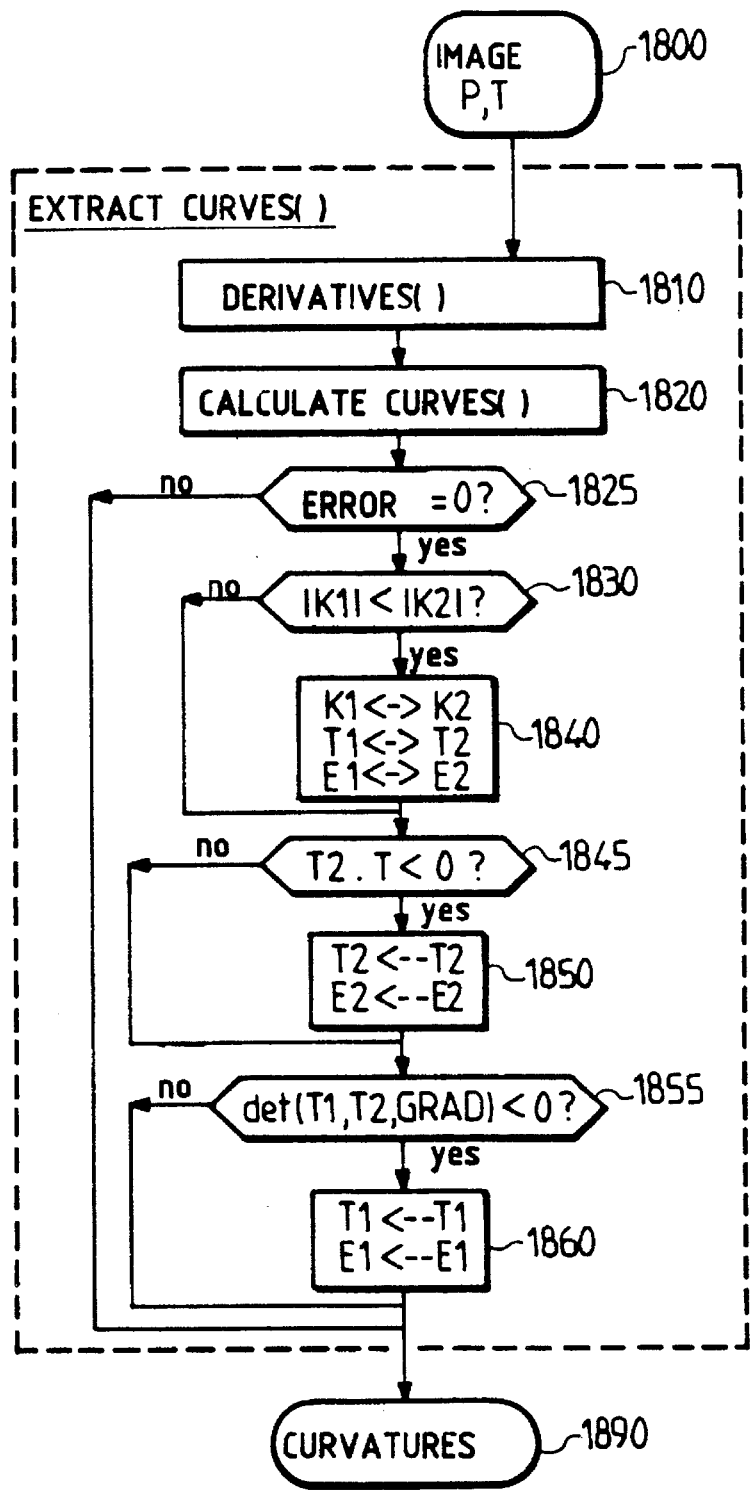
FIG. 21 illustrates a routine, called EXTRACT_CURVES()

The input step 1800 of this FIG. 21 consists of the reception of an image, of which a point P is designated, with, furthermore, a favoured direction in the space, represented, for example, in the form of a unit vector T in the three-dimensional space.

The first step of the routine of FIG. 21 is a step called DERIVATIVES(), denoted 1810. It consists essentially of the calculation of the successive derivatives up to order 3, for the image in question, at the point P.

The notation and the definition of these derivatives up to order 3 are given in annex II of the present description (the remainder of annex I will be discussed later). It will be called "DIFFER structure" in what follows.

In order to calculate these derivatives, a first useful means consists of an interpolation function INTERPOLATE(), capable of defining the values of a point of the image not necessary having integer coordinates corresponding to the meshing in which this image is defined. Such an interpolation function makes it possible, from the available three-dimensional image, to gain access to a continuous function F of the three-dimensional space, of which all the points pass through the points of the image as sampled.

As interpolation function, it is possible to use a linear filtering technique. In this case, the value V of the function F as interpolated at a point P corresponds to the convolution of the three-dimensional image IMAGE by a three-dimensional smoothing function G, defined in advance.

In these conditions, in order to obtain the derivatives at the required degree of the function F at point P, it is sufficient to carry out the convolution of the image with the corresponding derivative of the chosen smoothing function G.

A description of this technique is found in the work "COMPUTER VISION", Dana H. BALLARD and Christopher M. BROWN, Prentice-Hall INC., Englewood Cliffs N.J. 07632, 1982.

In practice it is useful, for points P belonging to the received image IMAGE, to precalculate the 20 three-dimensional sub-images, with size fixed by the users, corresponding to the 20 possible derivatives of the function G, from order 0 to order 3.

Such sub-images are generally called convolution masks.

The calculation of a given derivative of the function F at point P, for example FXXY, with the notations of annex 2, is carried out by calculating the sum of the values of the image IMAGE around the point P, weighted by the values of the sub-image corresponding to the sampling of the function GXXY at the same point.

As a general rule, a gaussian function is used for function G, with the following expression:

$$G=exp\{-(x^2+y^2+z^2)\}$$

where exp{} designates the exponential function.

Yet another useful way of carrying out step 1810 for calculating the derivatives of the function F consists in calculating an approximation of the three-dimensional image IMAGE, in the form of a three-dimensional "SPLINE" function denoted F, constituted by the tensor product of three polynomial functions per small piece.

The derivatives of the function F are then tensor products of polynomial functions, of lower order, easy to calculate from the function F itself.

One example of implementing this technique is described in:

"Application of SPLINE functions to digital image processing", Philippe CINQUIN, Doctoral thesis, mathematics faculty, Scientific, Technological and Medical University of Grenoble, September 1987.

"Tricubic spline functions, an efficient tool for 3D images modelling", Philippe CINQUIN, Abstract congress ICIAM-1987, International conference on industrial and applied mathematics, Paris, July 1987.

After this step 1810 which has just been described in different variants, the step 1820 consists of a routine called CALCULATE_CURVE(). This routine receives as its input the DIFFER structure, whose constituents are the derivatives of the function F up to order 3, as defined in appendix II.

The first step of the routine CALCULATE_CURVES() consists in calculating the gradient GRAD of the function F, which is the vector defined by the formula (I) of annex I. In these formulae, reference is made to the work "Differential Geometry of Curves and Surfaces", Manfredo P. DO CARMO, Prentice-Hall, 1976.

Next its norm or modulus is calculated, squared, according to formula (II). The elements for calculating its gaussian curvature K are defined by the formula (III). The mean curvature A is in its turn defined by the formula (IV).

The formula (V) defines the calculation mode of the discriminant D associated with these two curvatures, which are given by a second-degree equation (obtained from their half-sum A and from their already defined product K).

Finally, the formulae (VI) and (VII) indicate how it is possible to calculate the main curvatures K1 and K2 of the surface defined by the implicit equation F(x,y,z)=S in the vicinity of the point P, with F(P)=S.

Although a few of the formulae which have just been invoked have already been described, the applicant considers that, taken together, these formulae constitute a novel means for giving access to differential characteristics of a three-dimensional image. The formulae (VIII) to (XIV) coming below are for their part considered to be novel.

Starting from there, the main curvature T1 is defined in the shape of a direction by a vector, which itself depends on two other vectors denoted ALPHA and BETA.

The three components of the ALPHA vector are given by the formulae (VIII). The three components of the BETA vector are defined by the formulae (IX).

The three components of the vector T1 are defined by the formula (X). They correspond to the vector difference between the ALPHA vector and D times the BETA vector, d being the discriminant defined by the formula (V). If it is not zero, this vector T1 defines the first main direction of curvature; it is then normed, that is to say divided by its modulus.

Similarly, a vector T2 is calculated, equal to the sum of the ALPHA vector and of D times the BETA vector, and this vector T2 is normed in its turn.

If one of the two main vectors T1 and T2 is zero, then it may be replaced by the vector product of the other main vector (non zero) and of the gradient GRAD.

If both vectors are zero, then a flag ERROR is set to 1.

An original element of the formulae which have just been described for calculating the main directions is that the main axes of the space (X, Y, Z) play a symmetric role in the formulae giving the two main vectors T1 and T2. More precisely, the formulae of their coordinates along Y and along Z are obtained by circular permutation of (X, Y, Z) in the formula describing the coordinate along X.

It will be noted that up to now only the derivatives up to order 2 of function F have been used.

After having thus determined the main direction vectors T1 and T2, calculation of the derivatives along x, y and z of the main curvatures at K1 and K2 is performed. This is carried out by differentiation of the formulae (VI) and (VII), giving rise to a vector GRADK1=(K1X, K1Y, K1Z) and another vector GRADK2=(K2X, K2Y, K2Z), as indicated by the formulae (XII).

Now the derivatives of the function F have been brought into play, up to order 3 inclusive.

Another particularly original characteristic of the invention consists in establishing extreme coefficients, which characterize the crest lines present in a three-dimensional image.

A first extreme coefficient E1 is obtained by producing the scalar product of the vector GRADK1 and of the vector T1, in accordance with the formula (XIII).

Another extreme coefficient E2 is similarly obtained by scalar product of the vector GRADK2 and of the vector T2, in accordance with the formula (XIV).

The signs of the extreme coefficients E1 and of E2 are directly linked to the orientation of the vectors T1 and T2 in the space.

This working technique operates in nearly all cases. There are, however, very rare exceptions where it is not possible to calculate the main direction vectors T1 and T2. This is the case, for example, when the gradient vector GRAD is a zero vector, or also for points known as "umbilical" (see the work by DO CARMO) corresponding to the case in which the two main curvatures K1 and K2 are equal. In these cases, this impossibility is represented by setting the ERROR flag of the curvature structure to the value 1. In all the other cases, where the calculations have run correctly, this flag is set to zero.

Whatever happens, the routine CALCULATE_CURVES() supplies a CURVATURE structure thus filled, or possessing an ERROR flag at 1. The CURVATURE structure is illustrated in appendix 3.

Attention will now focus on a particularly important variant of the invention. It relates to the extraction of lines from an image, in the particular case where crest lines are of interest.

The crest lines of an iso-surface of a three-dimensional image are defined as being the zero-crossing of the extreme coefficient for this surface. The crest lines are therefore the bi-iso-lines of which:

one of the iso-surfaces is defined from the three-dimensional image itself, and from a threshold or iso-value S supplied by the user;

the other iso-surface is calculated with, as VALUE2(), the calculation of the extreme coefficient for the same image, and an associated iso-value or threshold which is zero.

Consequently, first of all the routine RUN_LINE() is used for a regular three-dimensional grid, with, as conversion routine, VALUE1(), reading the corresponding voxel of the three-dimensional image (possibly converted) in memory, and, as first threshold, S1, a chosen threshold S.

The routine VALUE2() is then in fact the routine serving for calculating the extreme E1 by the routine CALCULATE_CURVE(), with a threshold S2=0.

However, this routine CALCULATE_CURVE() requires, for optimal operation, that a favoured direction of the space T is defined to it. This direction cannot be fixed once and for all for the entirety of the implementation of the invention over a given image; in effect, to proceed thus would give rise to undesirable cutoffs along the crest lines.

Consequently, it is adjudged preferable to orient the calculation of the extreme with the aid of the direction of the crest line which is currently being followed.

This can be carried out by slightly modifying the routines RUN_UNI_LINE() and SEGMENTS_POLYHEDRON(), so that these routines further accept, as input, the indication of a favoured direction T in the space.

As far as the routine RUN_UNI_LINE(), is concerned, defining this direction T corresponds to passing the direction (P1, P2), as a parameter, to the level of the block B210 of FIG. 15. Similarly, the direction (P2, P1) will be passed to the level of the block B220 of the same Figure.

If no segment has yet been determined, the direction T which has been passed as input argument for the routine RUN_UNI_LINE() is kept.

At the instant when the routine RUN_UNI_LINE() calls the routine SEGMENTS_POLYHEDRON(), the latter will use the direction T at the level of the block 130 of FIG. 12, by passing the direction T to the routine VALUE2(), which, in this case, is the routine EXTRACT_CURVES() returning the extreme E1.

The person skilled in the art will also have noted that the routine SEGMENTS_POLYHEDRON() is also used in the routine RUN_LINES(), at the level of the block B120 of FIG. 14. In this case, an arbitrary direction T may be deemed to be sufficient.

Figure 16:
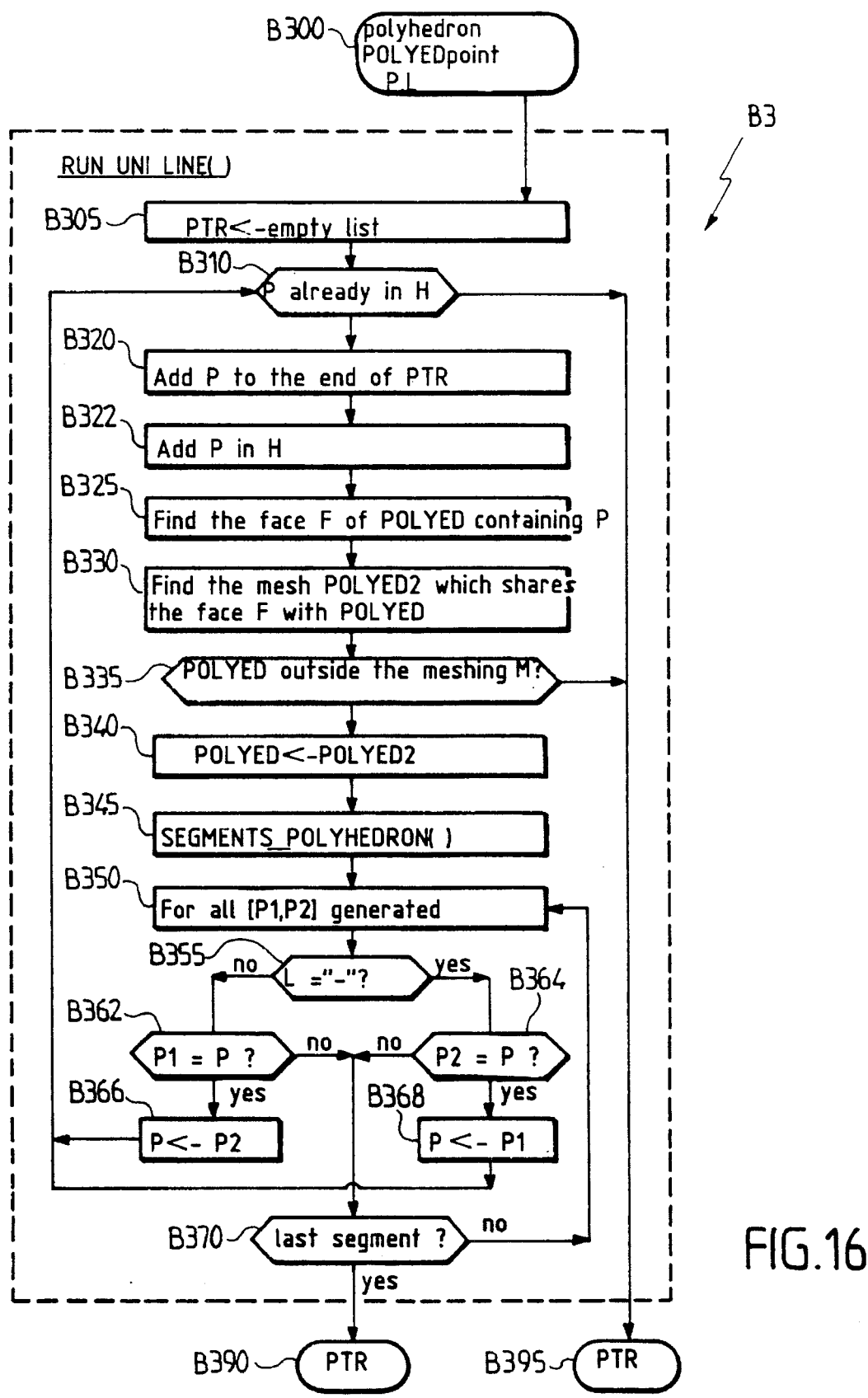
FIG. 16 illustrates a routine, called RUN_UNI_LINE()

Moreover, in this working mode, it is possible to consider that the execution of the routine RUN_UNT_LINE() is terminated at the level of the block B345 of FIG. 16, when it is not possible to calculate the extreme coefficient for one of the vertices of the voxel in question. In this case, physically represented by the fact that the ERROR flag of the CURVATURE field is equal to 1, the exit is through the block B395 of this same FIG. 16, returning the list PTR already constituted up to the present.

The invention applies also for determining "iso-gaussian" lines. In this case, the input is a three-dimensional image, accompanied by two thresholds S1 and S2. The routine VALUE1() corresponds simply to reading the three-dimensional image in memory in order to determine the value of the corresponding voxel. S1 is the iso-value threshold defining the iso-surface in the three-dimensional image chosen for the user. The second input routine VALUE2() corresponds to the calculation of the gaussian curvature K by the routine EXTRACT_CURVE() already mentioned, and the second threshold S2 is the value of the iso-gaussian of the iso-surface which the user requires. The routines SCAN_MESH() or RUN_LINE() do not have to be modified, since the calculation of the gaussian curvature does not depend on an orientation in the space, as was the case for the extreme coefficient of the crest lines.

Needless to say, no limiting character should be ascribed to the two abovementioned cases of conjoint use of the line extraction technique and of the means of calculating the differential characteristics of the iso-surfaces, all on the same image.

Numerous variants may be envisaged. Each variant corresponds to the case in which modifications are applied to the mode of deriving the input routines VALUE1() and VALUE2() which may affect either the image data themselves, or their differential characteristics, or any other information capable of having a bearing on the image in question.

Figure 22:
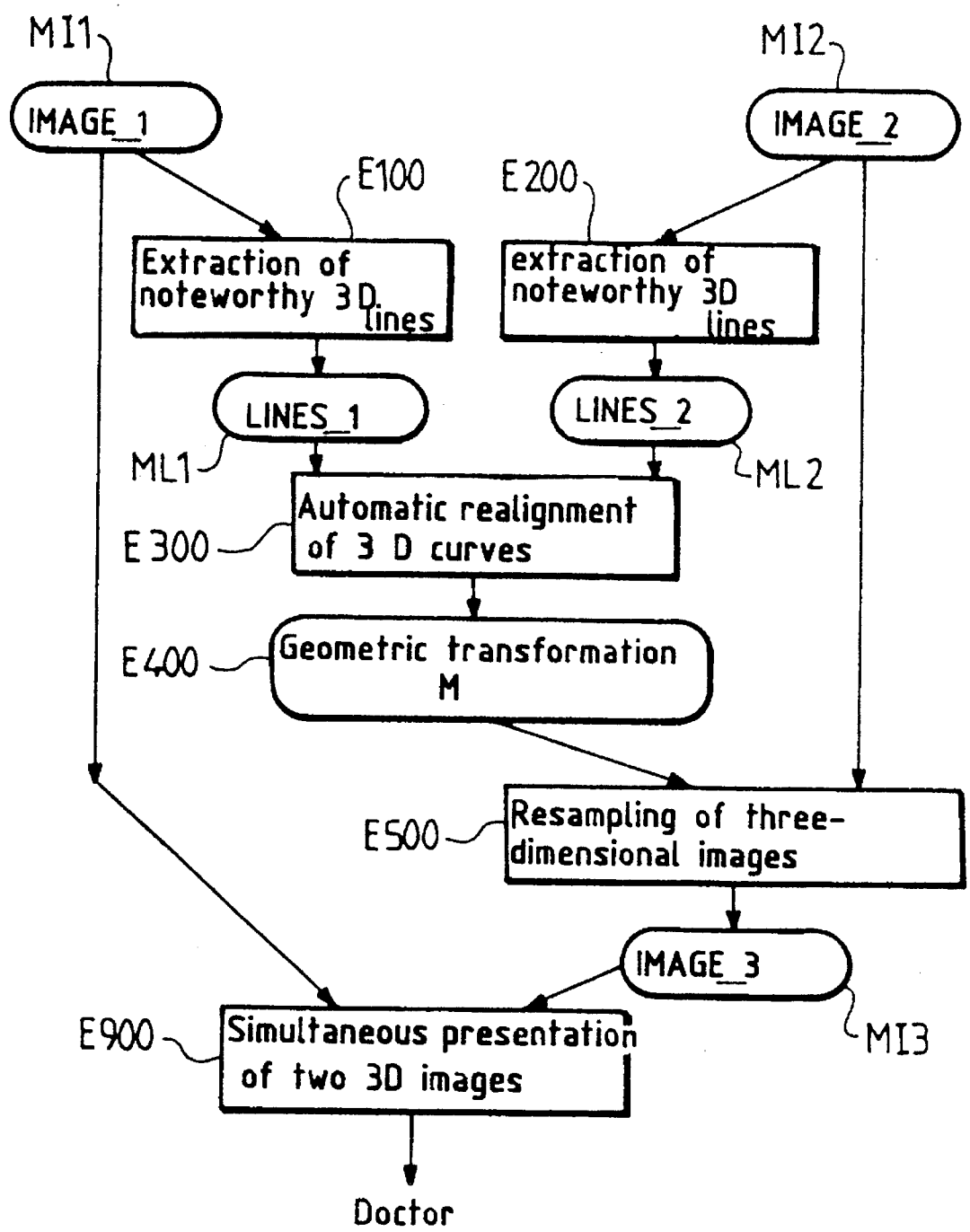
FIG. 22 illustrates an example of an image realignment mechanism in correspondence with FIG. 2.

Another important application of the invention will now be described with reference to FIGS. 22 and 23.

The invention in effect allows the realignment and resampling of two three-dimensional images IMAGE_1 and IMAGE_2, which relate to the same subject, but are taken in two different positions. These may be medical images such as those from a X-ray scanner or those obtained by nuclear magnetic resonance, for example.

The most general theoretical diagram of this is given in FIG. 2, already mentioned.

The images IMAGE1 and IMAGE2 are stored in memories MI1 and MI2, and a memory MI3 has been provided in standby for storing an intermediate image.

On each of the two images MI1 and MI2 the invention has been implemented as described above, so as to extract significant three-dimensional lines from the image, such as, for example, these crest lines. These routines are shown diagrammatically at E100 and E200 in FIG. 22. This results in data, in line memories, respectively stored in ML1 and ML2.

From there, another processing unit will carry out the automatic realignment of the curves in the three-dimensional space which these two sets of lines represent. This is step E300.

Its purpose is to supply as its output a geometric transformation suitable for making it possible to pass from one of the sets of lines to the other. It is assumed here that it is a question of the transformation which must be applied to the LINE_2 information in order to superimpose them (substantially) on the LINE_1 set of data.

In a general way, such a transformation can be described in the form of a matrix of 4×4 size, which gives the transformation in homogeneous coordinates existing from one to the other of the sets of data. More precisely, if P1: (P1X, P1Y, P1Z, 1) denotes the vector in homogeneous coordinates which represents the position of a point in the image IMAGE_1, and P2 denotes the corresponding position in the image P2, the matrix M is then defined by:

$$P2 = M \times P1$$

A technique which can be used for the realignment of three-dimensional lines is described, for example, in the document "Smoothing and Matching of 3-D Space Curves", Andre GUEZIEC and Nicolas AYACHE, INRIA Research Report No. 1544, October 1991.

The matrix thus determined is obtained at step 400.

It is then possible, in various ways, to make use of it in order, automatically or with the intervention of an operator, to bring together the information contained in the two image memories MI1 and MI2.

An example of such an automatic bringing together will be described below.

According to this example, the step E500 consists in resampling the three-dimensional image MI2, taking account of the transformation defined by the matrix M.

Figure 23:
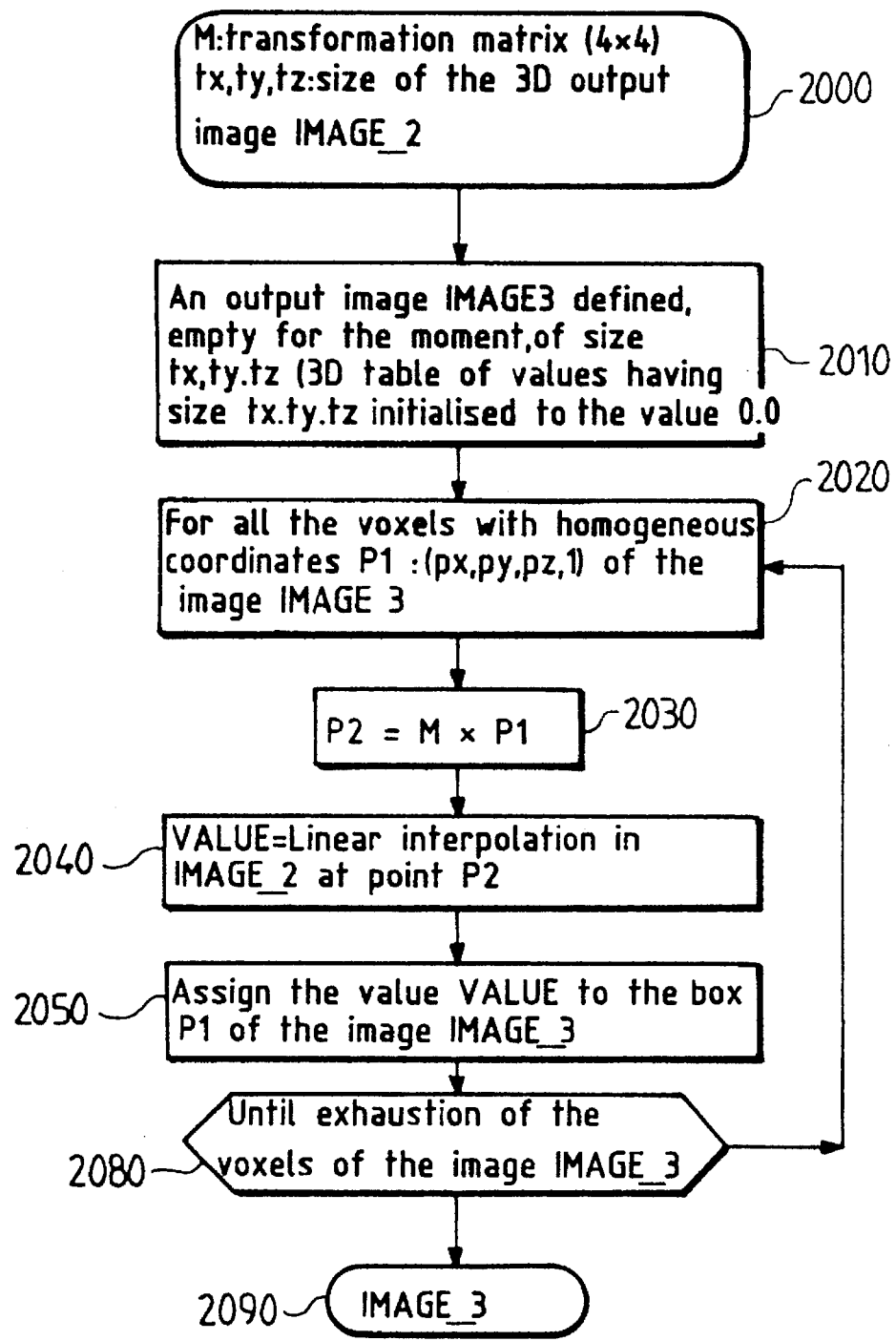
FIG. 23 illustrates an example of an image resampling mechanism usable in the image realignment mechanism of FIG. 22.

In FIG. 23, the input step 2000 consists in receiving the transformation matrix M, as well as, at Tx, Ty and Tz, data fixing the size of the three-dimensional image desired as the output. Access is available to the data in the memory MI2 which define the IMAGE_2 image.

Step 2010 of the three-dimensional image resampling routine corresponds to the preparation of an output image denoted IMAGE_3, which is empty for the moment with a size Tx * Ty * Tz. This means that a three-dimensional table of values is prepared, a table whose three size parameters are Tx, Ty and Tz, and of which all the values are for the moment considered to be zeros.

At step 2030 of the routine, for all the voxels possessing homogeneous coordinates P1: (Px, Py, Pz, 1), of the standby image IMAGE_3, a loop is carried out which carries on until it has run through the whole of the table at step 2080.

For each of these points to be calculated of IMAGE_3, step 2030 consists in determining, via the relation P2=M P1, what is the corresponding point in image 2.

At step 2040, it is determined by linear interpolation in the IMAGE_2 image, at point P2, what is the value corresponding to this point (which, a priori, has no chance of falling exactly on an already-sampled point in IMAGE_2).

Step 2050 assigns this VALUE which has just been calculated to the box P1 of the image IMAGE_3.

At the end of the routine, at the step 2090 the memory MI3 has been filled with all the points of IMAGE_3.

This having been done, one of the simplest applications (FIG. 22) consists in producing, on an appropriate visual display tool, a simultaneous presentation of the two 3D images for the attention of a doctor, for example in different colours, or better via a double cursor, the images being arranged side by side.

SPECIFIC EXAMPLE

The invention has been implemented on a DEC 5000 (Digital Equipment) model workstation. The routines described were produced in the C language, which allows dynamic allocation of memory, and the use of pointers.

A three-dimensional image of 64 * 64 * 64 pixels representing a tomographic X-ray view of a skull was taken as IMAGE_1, in cubic meshing.

Figure 24:
FIGS. 24 and 25 are two examples of images obtained with the aid of the present invention.

The result (projected in black and white on a plane and simplified by filtering in order to be readable in plan view) is given in FIG. 24. Despite this simplification, the main features of a human skull are clearly distinguished. It should be noted that the definition of the crest lines is substantially better than that of the initial image.

Figure 25:
Figure 26:
FIG. 26 illustrates the comparison of the two images.

In similar conditions, FIG. 26 shows how it is possible to automatically superimpose (with the aid of the crest lines and after reprocessing of one of them) two images (FIG. 24 and 25) of the same subject taken in different conditions. This was completely impossible to achieve with the means of the state of the art.

The means provided according to the invention are extremely powerful, in the sense that, without any manual intervention, the doctor can, for example:

have available crest lines of a three-dimensional image (the operation being, up to the present, carried out by drawing freehand, for example in facial surgery); or have available a comparison of two images of the same subject obtained in different positions, and brought back to the same position.

In other words, an automatic processing suite is thus obtained which makes it possible to take two medical images of the same subject, but acquired in different positions, and to transform them still into two images of the same subject, but brought back to the same geometric position. This considerably facilitates the diagnosis by the doctor. For example, if two images of the same subject taken at different times are involved, he can follow the evolution of symptoms of an illness. It is also possible to compare the same organ from two different patients. It is also possible to follow the movement of one organ over the course of time.

In another application, the technique of automatic realignment is used to compare and realign a three-dimensional medical image with an anatomical chart, in order to attribute a name to each of the parts of the organ examined, and still to do so automatically.

The comparison of images relating to two different subjects also has a meaning. After realignment according to the technique described, it is possible to observe the deviations between lines which are corresponding, and to calculate local deformations between these two sets of lines (realignment with deformation

---

APPENDIX 1-1
Formulae (I) $\quad$ GRAD: ( FX, FY, FZ );

(II) $\quad H = FX^2 + FY^2 + FZ^2$;

(III) $\quad K = [FX^2 \cdot (FYY \cdot FZZ - FYZ^2) + 2 \cdot FY \cdot FZ \cdot (FXZ \cdot FXY - FXX \cdot FYZ) +$
$\quad\quad FY^2 \cdot (FXX \cdot FZZ - FXZ^2) + 2 \cdot FX \cdot FZ \cdot (FYZ \cdot FXY - FYY \cdot FYZ) +$
$\quad\quad FZ^2 \cdot (FXX \cdot FYY - FXZ^2) + 2 \cdot FX \cdot FY \cdot (FXZ \cdot FYZ - FZZ \cdot FXY)]/H^2$;

(IV) $\quad A = [FX^2 \cdot (FYY + FZZ) - 2 \cdot FY \cdot FZ \cdot FYZ +$
$\quad\quad FY^2 \cdot (FXX + FZZ) - 2 \cdot FX \cdot FZ \cdot FXZ +$
$\quad\quad FZ^2 \cdot (FXX + FYY) - 2 \cdot FX \cdot FY \cdot FXY]/(2 \cdot H^{3/2})$;

(V) $\quad D = A^2 - K$;

(VI) $\quad K1 = A + D^{1/2}$;

(VII) $\quad K2 = A - D^{1/2}$;

---

APPENDIX 1-2

(VIII) $\quad$ ALPHA: (ALPHA$_x$,ALPHA$_y$,ALPHA$_z$) with
$\quad$ ALPHA$_x$ = $[2 \cdot FZ^3 \cdot FXY - FY^3 \cdot FZZ - 2 \cdot FY^3 \cdot FXZ + 2 \cdot FY^2 \cdot FZ \cdot FXY - 2 \cdot FZ^2 FX \cdot FYZ$
$\quad\quad - 2 \cdot FZ^2 \cdot FY \cdot FXZ + 2 \cdot FY^2 \cdot FX \cdot FYZ + 2 \cdot FZ \cdot FX \cdot FY \cdot FZZ - 2 \cdot FX \cdot FY \cdot FZ \cdot FYY$
$\quad\quad - FY^2 \cdot FZ \cdot FXX + 2 \cdot FZ^2 \cdot FX \cdot FXZ - FZ \cdot FX^2 \cdot FZZ + FX^2 \cdot FZ \cdot FYY$
$\quad\quad - 2 \cdot FZ^2 \cdot FY \cdot FYZ + FZ \cdot FY^2 \cdot FZZ - FZ^3 \cdot FXX + FZ^3 \cdot FYY + 2 \cdot FY^2 FX \cdot FXZ$
$\quad\quad - 2 \cdot FX^2 \cdot FY \cdot FYZ + FY^3 \cdot FXX - 2 \cdot FX \cdot FZ^2 \cdot FXY + FY \cdot FZ^2 \cdot FXX$

APPENDIX 1-2

$$\begin{aligned}
&+ 2 \cdot FZ \cdot FY^2 \cdot FYZ - FY \cdot FZ^2 \cdot FYY + 2 \cdot FZ \cdot FX^2 \cdot FYZ - 2 \cdot FX \cdot FY^2 \cdot FXY \\
&- FX^2 \cdot FY \cdot FZZ + FX^2 \cdot FY \cdot FYY]/(2 \cdot H^{3/2}); \\
ALPHA_y = &[-2 \cdot FZ^3 \cdot FXY + 2 \cdot FZ^2 \cdot FX \cdot FYZ + 2 \cdot FZ^2 \cdot FY \cdot FXZ - 2 \cdot FZ \cdot FX \cdot FY \cdot FZZ \\
&- FY^2 \cdot FZ \cdot FXX + 2 \cdot FZ^2 \cdot FX \cdot FXZ - FZ \cdot FX^2 \cdot FZZ + FX^2 \cdot FZ \cdot FYY \\
&- 2 \cdot FZ^2 \cdot FY \cdot FYZ + FZ \cdot FY^2 \cdot FZZ - FZ^3 \cdot FXX + FZ^3 \cdot FYY + 2 \cdot FY^2 \cdot FX \cdot FXZ \\
&- 2 \cdot FX^2 \cdot FY \cdot FYZ + 2 \cdot FX^3 \cdot FYZ - 2 \cdot FX^2 \cdot FZ \cdot FXY - 2 \cdot FX^2 \cdot FY \cdot FXZ \\
&+ 2 \cdot FX \cdot FY \cdot FZ \cdot FXX - FX^3 \cdot FYY + 2 \cdot FY \cdot FZ^2 \cdot FXY + FX \cdot FZ^2 \cdot FXX + FX^3 \cdot FZZ \\
&- FX \cdot FZ^2 \cdot FYY - 2 \cdot FZ \cdot FY^2 \cdot FXZ - 2 \cdot FZ \cdot FX^2 \cdot FXZ - FX \cdot FY^2 \cdot FXX \\
&- FX \cdot FY^2 \cdot FZZ + 2 \cdot FY \cdot FX^2 \cdot FXY]/(2 \cdot H^{3/2}); \\
ALPHA_z = &[-FY^3 \cdot FZZ + 2 \cdot FY^3 \cdot FXZ - 2 \cdot FY^2 \cdot FZ \cdot FXY - 2 \cdot FY^2 \cdot FX \cdot FYZ \\
&+ 2 \cdot FX \cdot FY \cdot FZ \cdot FYY - 2 \cdot FX^3 \cdot FYZ + 2 \cdot FX^2 \cdot FZ \cdot FXY + 2 \cdot FX^2 \cdot FY \cdot FXZ \\
&- 2 \cdot FX \cdot FY \cdot FZ \cdot FXX - FX^3 \cdot FYY + 2 \cdot FY \cdot FZ^2 \cdot FXY + FX \cdot FZ^2 \cdot FXX + FX^3 \cdot FZZ \\
&- FX \cdot FZ^2 \cdot FYY - 2 \cdot FZ \cdot FY^2 \cdot FXZ - 2 \cdot FZ \cdot FX^2 \cdot FXZ - FX \cdot FY^2 \cdot FXX \\
&+ FX \cdot FY^2 \cdot FZZ + 2 \cdot FY \cdot FX^2 \cdot FXY + FY^3 \cdot FXX - 2 \cdot FX \cdot FZ^2 \cdot FXY + FY \cdot FZ^2 \cdot FXX \\
&+ 2 \cdot FZ \cdot FY^2 \cdot FYZ - FY \cdot FZ^2 \cdot FYY + 2 \cdot FZ \cdot FX^2 \cdot FYZ - 2 \cdot FX \cdot FY^2 \cdot FXY \\
&- FX^2 \cdot FY \cdot FZZ + FX^2 \cdot FY \cdot FYY]/(2 \cdot H^{3/2});
\end{aligned}$$

(IX)      BETA: $(FZ - FY, FX - FZ, FY - FX)$;
(X)      T1: $(T1_x, T1_y, T1_z) = ALPHA - D \cdot BETA$;
(XI)      T2: $(T2_x, T2_y, T2_z) = ALPHA - D \cdot BETA$;

APPENDIX 1-3

(XII)      GRADK1: (K1X, K1Y, K1Z) and GRADK2: (K2X, K2Y, K2Z) with
$K1X = \partial K1/\partial x$;     $K1Y = = \partial K1/\partial y$;     $K1Z = = \partial K1/\partial z$;
$K2X = \partial K2/\partial x$;     $K2Y = = \partial K2/\partial y$;     $K2Z = = \partial K2/\partial z$;

(XIII)      $E1 = K1X \cdot T1_x + K1Y \cdot T1_y + K1Z \cdot T1_z$;

(XIV)      $E2 = K2X \cdot T2_x + K2Y \cdot T2_y + K1Z \cdot T1_z$;

(XV)      $P = P1 + \dfrac{(S - V1)}{(V2 - V1)} \cdot \overrightarrow{P1P2}$ (XVI)      $P = A1 + u\, A1A2$ (XVII)      $P = B1 + v\, B1B2$ with: $\begin{pmatrix} u \\ v \end{pmatrix} = \begin{pmatrix} -\overrightarrow{A1A2}^2 & \overrightarrow{A1A2} \cdot \overrightarrow{B1B2} \\ \overrightarrow{A1A2} \cdot \overrightarrow{B1B2} & -\overrightarrow{B1B2}^2 \end{pmatrix}^{-1} \begin{pmatrix} \overrightarrow{A1A2} \cdot \overrightarrow{A1B1} \\ \overrightarrow{B1B2} \cdot \overrightarrow{A1B1} \end{pmatrix}$ (XVIII)      P1: (u1, v1) and P2: (u2, v2) solutions of:
V11 + (V14−V11) u + (V12−V11) v + (V13+V11−V14−V12) uv = S1
V21 + (V24−V21) u + (V22−V21) v + (V23+V21−V24−V22) uv = S2

APPENDIX 2

The DIFFER structure is constituted by the 20 values:
F,FX,FY,FZ,FXX,FYY,FZZ,FXY,FXZ,FYZ,FXXX,FYYY,FZZZ,FXXY,FXYY,FXYZ,FYYZ,
FYZZ,FXXZ et FXZZ.
corresponding to derivatives of F up to order 3,
following the following conventions:

Start function:     F;
Order-0 derivatives:     F;
Order-1 derivatives:     $FX = \delta F/\delta x$; $FY = \delta F/\delta y$; $FZ = \delta F/\delta z$;

Order-2 derivatives:
$FXX = \partial^2 F/\partial x^2$;     $FYY = \partial^2 F/\partial y^2$;     $FZZ = \partial^2 F/\partial z^2$;
$FXY = \partial^2 F/\partial x \partial y$;     $FXZ = \partial^2 F/\partial x \partial z$;     $FYZ = \partial^2 F/\partial y \partial z$;

Order-3 derivatives:
$FXXX = \partial^3 F/\partial x^3$;     $FYYY = \partial^3 F/\partial y^3$;     $FZZZ = \partial^3 F/\partial z^3$;
$FXXY = \partial^3 F/\partial x^2 \partial y$;     $FXYY = \partial^3 F/\partial x \partial y^2$;     $FXYZ = \partial^3 F/\partial x \partial y \partial z$;
$FYYZ = \partial^3 F/\partial y^2 \partial z$;     $FYZZ = \partial^3 F/\partial y \partial z^2$;     $FXXZ = \partial^3 F/\partial x^2 \partial z$;
$FXZZ = \partial^3 F/\partial x \partial z^2$;

| APPENDIX 3 |
|---|

The CURVATURES structure may contain the values GRAD, K, A, K1, K2, E1, E2, the vectors T1 and T2, as well as the flag ERROR, with:

| GRAD: | gradient of the function F |
|---|---|
| K: | gaussian curvature |
| A: | mean curvature |
| K1, K2: | main curvatures |
| T1, T2: | main directions of associated curvatures |
| E1, E2: | associated extreme coefficients |
| ERROR: | flag |

We claim:

1. An electronic device for processing image information comprising:

(a) image definition means for supplying, in correspondence with a polyhedral meshing of a portion of a space, a numerical value for each vertex of the polyhedral meshing, (b) polygon processing means for receiving a representation of a polygon with p vertices in a plane p respective values for the p vertices, and a threshold, and for supplying, in correspondence with the polygon a list of oriented segments linking points of edges of the polygon interpolated as equal to the threshold, in conformance with a predetermined direction convention, (c) polyhedron processing means for receiving a representation of a polyhedron with values at vertices thereof and a threshold, and for calling the polygon processing means for each face of the polyhedron, the polygon processing means supplying a list of oriented segments, and associating with the polyhedron a list of closed and oriented cycles formed by segments from the list of oriented segments, and (d) main processing means for presenting sequentially a plurality of polyhedrons of the polyhedral meshing to the polyhedron processing means, with values associated with vertices thereof and a threshold, said polyhedron processing means thus producing cycles, the cycles belonging to an iso-surface of an image for the threshold value.

2. A device according to claim 1, wherein the main processing means is configured to receive two sets of values for points of the portion of a space, and two thresholds, and is further configured to determine characteristic lines by intersection of iso-surfaces corresponding to the two sets of values.

3. A device according to claim 2, further comprising:

cycle intersection means for receiving two cycles of the polyhedron and, for searching, for each pair of segments constructible with the two cycles, whether the segments are in a same face of the polyhedron, wherein if the segments are in the same face of the polyhedron an intersection of the two segments is sought and an intersection point is retained, in order finally to constitute the list of oriented segments;

and wherein the main processing means is configured to present sequentially to the polyhedron processing means two pluralities of polyhedrons of the polyhedral meshing with values associated with the vertices thereof and a threshold, and wherein cycles are obtained at the cycle intersection means, the main processing means supplying significant lines by intersection of two iso-value surfaces.

4. A device according to claim 2, wherein the main processing means is configured to determine significant lines by running through each cycle supplied by the polyhedron processing means, for one value of a first of the two sets of values at each point to:

determine the value of a second set at each vertex of a cycle, search by interpolation, over the segments of the cycle, intermediate points having a second of the two thresholds as a value of the second set, and form points oriented segments approximating a representation of the significant lines.

5. A device according to claim 2, wherein the two sets of values belong to two different images.

6. A device according to claim 2, wherein one of the two sets of values belongs to one image, while the other set of values corresponds to differential values relating to the same image, supplying at least one line relating to the image.

7. A device according to claim 6, wherein the differential values belong to a group comprising, for a sampled or interpolated point of the image;

a gradient vector at the point, a gaussian curvature at the point, and a mean curvature at the point.

8. A device according to claim 6, wherein the differential values belong to a group comprising, for a sampled or interpolated point of the image:

the main curvatures at the point, and the main directions of curvature at the point.

9. A device according to claim 6, wherein the differential values comprise extreme coefficients at a sampled or interpolated point of the image.

10. A device according to claim 6, further comprising:

means for extracting significant lines from a first image, means for defining significant lines of a second image, means for determining, from the said significant lines, a geometric transformation for transforming from one of the images to the other, means for resampling, with interpolation, one of the images, realigned at the same points as the other, in compliance with the said geometric transformation; and means for comparing the image thus resampled with the other image.

11. A device according to claim 10, wherein the means for defining significant lines of a second image use a reference image of the significant lines.

12. A device according to claim 10, wherein the means for defining significant lines of a second image use a second image relating to a same object as the first, and comprise means for extracting significant lines from the second image.

13. A device according to claim 1, wherein the polygon processing means comprises means programmed to include:

(i) a first basic routine to receive as input a pair of points, respective values thereof, and a threshold in order to compare the values with the threshold, wherein if directions obtained from comparing the values with the threshold are different an intermediate, interpolated point close to the threshold is determined and, a label is conferred thereon, linked to the direction of the comparison of a predetermined one of the two points in the pair, (ii) a second basic routine to receive a series of points forming a cycle, each point being accompanied by a label, to search for a first point having a given label to use as a start point, to set up a segment from the start point and from a following point, and to make a list of segments obtained with other points of the cycle until returning to the start point, and (iii) a first intermediate routine to receive p points associated with a polygon, p respective values thereof and a threshold, and, for each edge of the polygon, to employ the first basic routine to memorize possible interpolated points in a cycle area, to loop the cycle on itself, then to call the second basic routine and to store the list of oriented segments thus generated in correspondence with the polygon.

14. A device according to claim 13, wherein the first basic routine includes program steps responsive to one of the points of the pair having a value within a range of the threshold, to assign the point a value away from the threshold in a predetermined way.

15. A device according to claim 13, wherein the polyhedron processing means comprises means programmed to include:

a first higher routine to receive the polyhedron having the values at the vertices thereof and the threshold; then to call the first intermediate routine for each face of the polyhedron, and supply a list of segments; then, as long as the list of segments is not empty, to take the first segment of the list as a start of a cycle, and if necessary add any segment exhibiting a common extremity with the first segment, the cycle itself being incorporated in a list of cycles associated with the polyhedron until the list of segments is exhausted.

16. A device according to claim 15, wherein the main processing means is configured to receive two sets of values for the points of the portion of space, as well as two thresholds, and to determine characteristic lines by intersection of iso-surfaces corresponding to the two sets of values; and wherein the cycle intersection means comprise means programmed to include:

(i) a second intermediate routine to receive two segments or pairs of points of a polygonal face, and an oriented normal to establish, by determinant calculation, whether straight lines of the two segments intersect; then to determine whether the intersection forms part of the segments, and, if so, to retain the intersection as a first point with a label linked to the sign of the determinant; and (ii) a second higher routine to receive two cycles of the polyhedron, to search, for any pair of segments constructible from the two cycles, whether the segments are in a same face of the polyhedron, and, if so, to call the second intermediate routine; to add the point to a cycle, the cycle being looped back; and then to call the second basic routine, in order to generate a list of oriented segments belonging to the intersection line of two iso-value surfaces.

17. A device according to claim 16, wherein the first basic routine includes program steps responsive to one of the points of the pair having a value within a range of the threshold, to assign the point a value away from the threshold in a predetermined way; and wherein the cycle intersection means further comprises means programmed to include:

a third basic routine having program steps responsive to one of the points in the pairs having a value within a range of the threshold, to assign the point a value away from the threshold in another predetermined way, and to resume the determination of an intermediate point of the pair which corresponds to the threshold.

18. A device according to claim 16, wherein the interpolation between two vertices of a face is produced in hyperbolic mode; and wherein the cycle intersection means also determine the intersection points by hyperbolic interpolation.

19. A device according to claim 1, further comprising means for controlling mesh-by-mesh exploration of the polyhedron of the portion of space by the main processing means.

20. A device according to claim 19, further comprising means for controlling exploration of the polyhedron of the portion of space by the main processing means, by following an intersection line of two iso-surfaces.

21. A device according to claim 1, in which the meshing comprises a regular, parallelepipedal grid, wherein the polygon processing means directly compare, for each parallelogram face, configuration of the interpolated points equal to the threshold with a set of preestablished configurations.

22. A device according to claim 21, wherein the interpolation between two vertices of a face is produced in hyperbolic mode.

23. A device according to claim 1, in which the meshing comprises a tetrahedral grid, and wherein the polygon processing means directly compare, for each triangular face of a tetrahedron, a configuration of the interpolated points equal to the threshold with a set of preestablished configurations.

24. A device according to claim 1, in which the meshing comprises a tetrahedral grid, wherein the polyhedron processing means directly compare, for each tetrahedron, a configuration of the labels of the vertices of the tetrahedron with a set of preestablished configurations.

* * * * *